(12) United States Patent
Gejji

(10) Patent No.: US 10,546,581 B1
(45) Date of Patent: Jan. 28, 2020

(54) SYNCHRONIZATION OF INBOUND AND OUTBOUND AUDIO IN A HETEROGENEOUS ECHO CANCELLATION SYSTEM

(71) Applicant: Amazon Technologies, Inc., Seattle, WA (US)

(72) Inventor: Pushkaraksha Gejji, San Jose, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 70 days.

(21) Appl. No.: 15/699,586

(22) Filed: Sep. 8, 2017

(51) Int. Cl.
| | | |
|---|---|---|
| *G10L 15/22* | (2006.01) | |
| *G10L 21/0208* | (2013.01) | |
| *G10L 21/0232* | (2013.01) | |
| *G10K 11/16* | (2006.01) | |
| *G10L 15/20* | (2006.01) | |
| *G10L 25/84* | (2013.01) | |

(52) U.S. Cl.
CPC .............. *G10L 15/20* (2013.01); *G10L 15/22* (2013.01); *G10L 21/0232* (2013.01); *G10L 25/84* (2013.01); *G10L 2015/223* (2013.01); *G10L 2021/02082* (2013.01)

(58) Field of Classification Search
USPC ................................................ 704/226, 227
See application file for complete search history.

(56) References Cited

U.S. PATENT DOCUMENTS

| | | | | |
|---|---|---|---|---|
| 9,008,327 | B2* | 4/2015 | Triki | H04R 3/02 381/71.1 |
| 9,516,410 | B1* | 12/2016 | Ayrapetian | H04R 3/02 |
| 2005/0089148 | A1* | 4/2005 | Stokes, III | H04M 9/082 379/3 |
| 2007/0021958 | A1* | 1/2007 | Visser | G10L 21/0272 704/226 |
| 2008/0201138 | A1* | 8/2008 | Visser | G10L 21/0208 704/227 |
| 2012/0219146 | A1* | 8/2012 | Mason | H04M 9/082 379/406.01 |
| 2014/0177856 | A1* | 6/2014 | Sudo | H04R 3/002 381/66 |
| 2015/0063579 | A1* | 3/2015 | Bao | H04M 9/082 381/66 |
| 2015/0112672 | A1* | 4/2015 | Giacobello | H04M 9/082 704/233 |
| 2015/0133097 | A1* | 5/2015 | Jang | H04M 3/568 455/416 |
| 2015/0379992 | A1* | 12/2015 | Lee | G10L 15/22 704/275 |

(Continued)

*Primary Examiner* — Seong-Ah A Shin
(74) *Attorney, Agent, or Firm* — Pierce Atwood LLP

(57) ABSTRACT

An echo cancellation system that synchronizes output audio data with input audio data in a heterogeneous system. The system may append a most recent outgoing audio data frame to an incoming audio data frame to synchronize a receiving buffer with a transmission buffer. By synchronizing the receiving buffer with the transmission buffer, the incoming audio data frames may be associated with corresponding outgoing audio data frames. After synchronizing the incoming audio data frames and the outgoing audio data frames, the system may perform Acoustic Echo Cancellation by removing the outgoing audio data frames from the incoming audio data frames.

20 Claims, 16 Drawing Sheets

(56) References Cited

U.S. PATENT DOCUMENTS

2016/0019907 A1\* 1/2016 Buck ................. H04M 9/082
                                                            704/226
2016/0322045 A1\* 11/2016 Hatfield ............... G10L 15/22
2018/0174598 A1\* 6/2018 Shabestary ......... H04M 9/082

\* cited by examiner

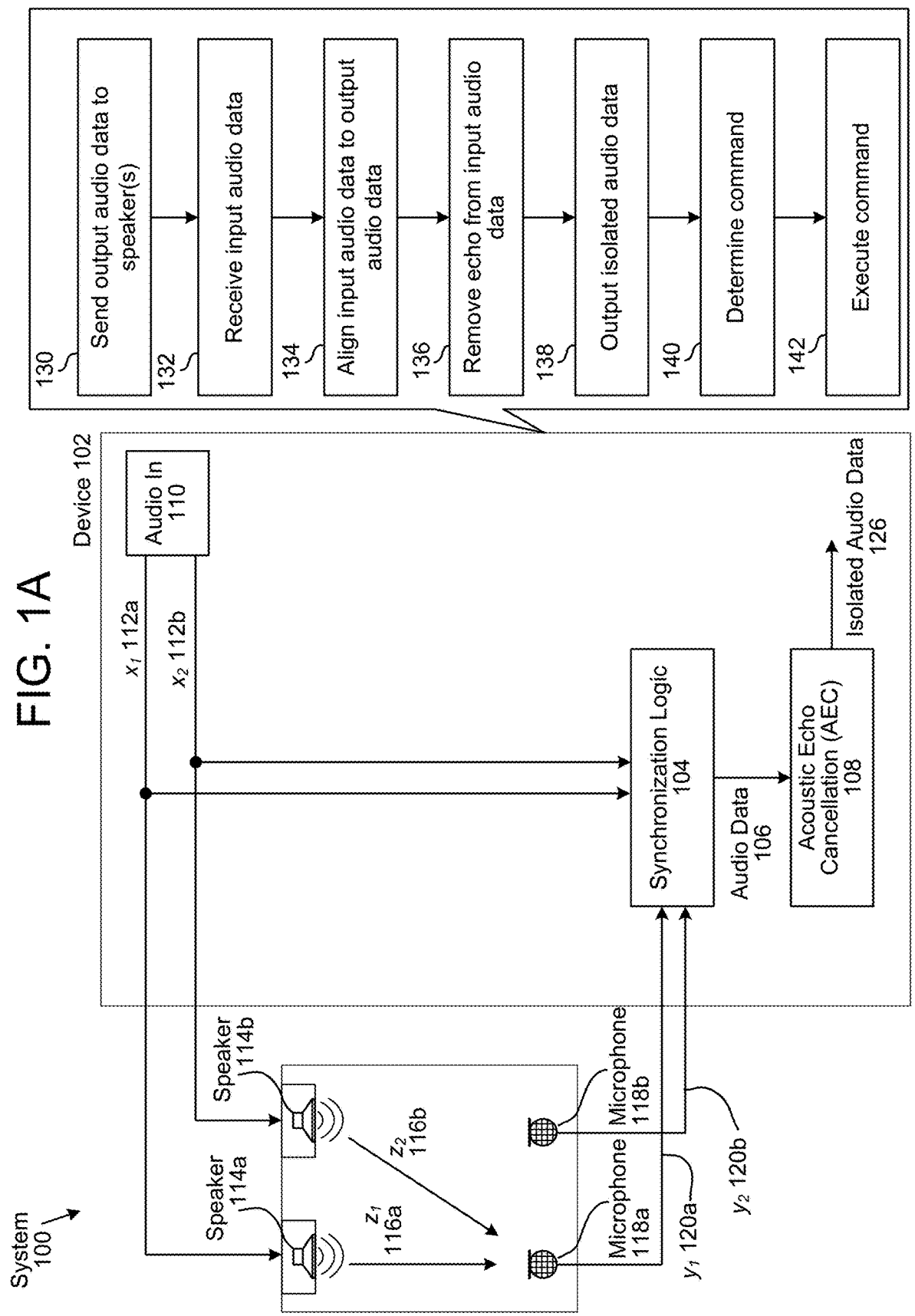

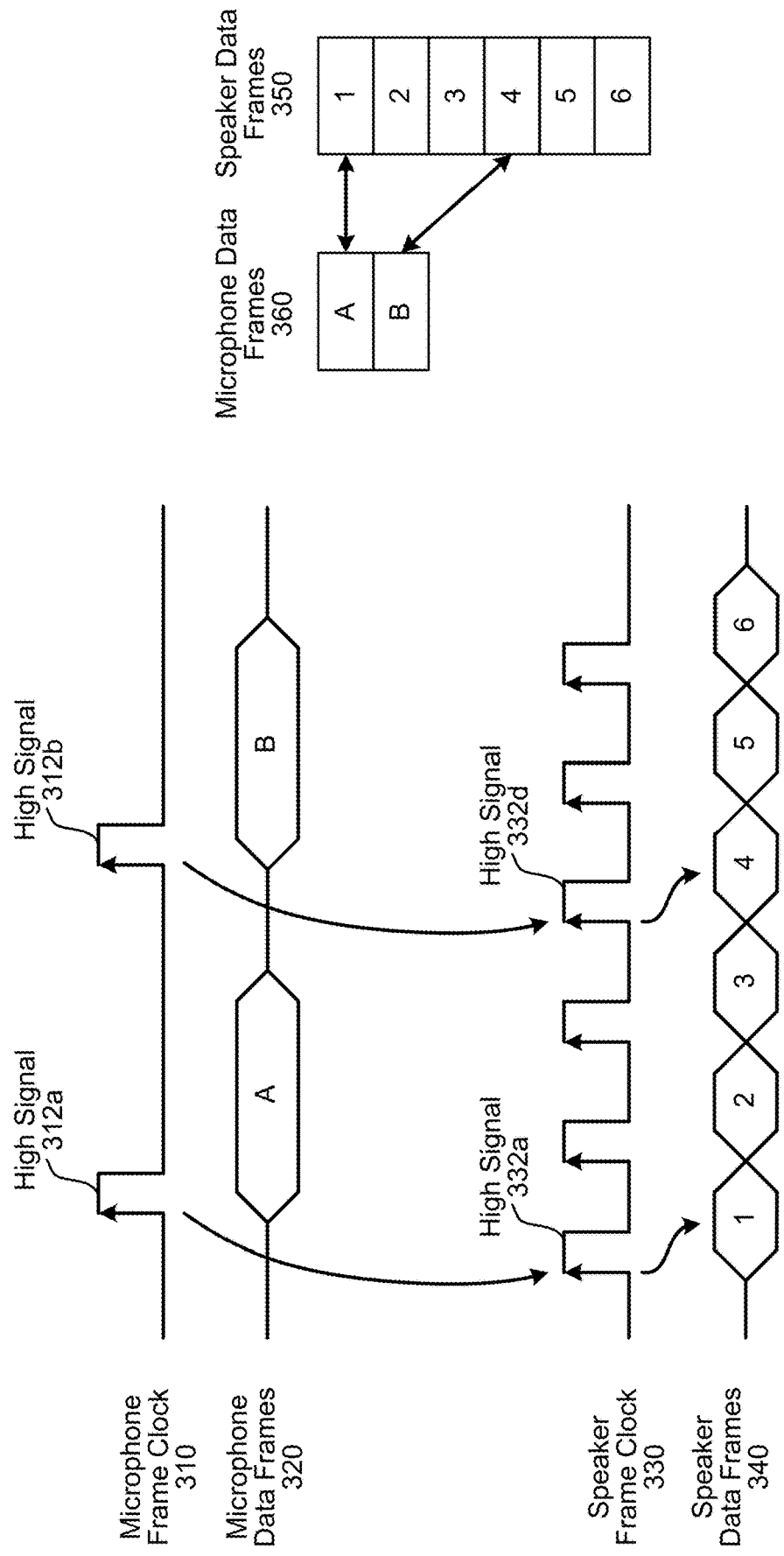

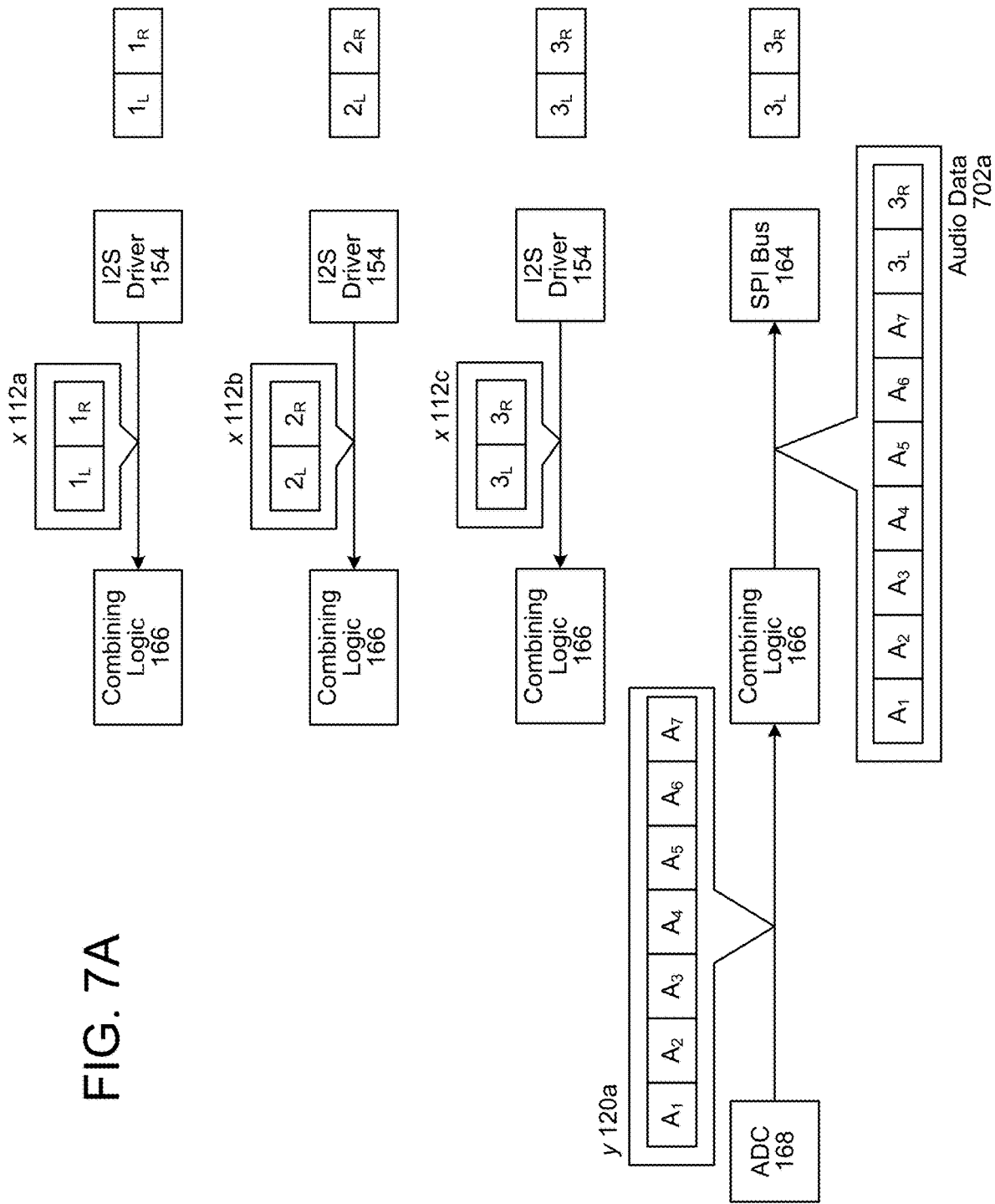

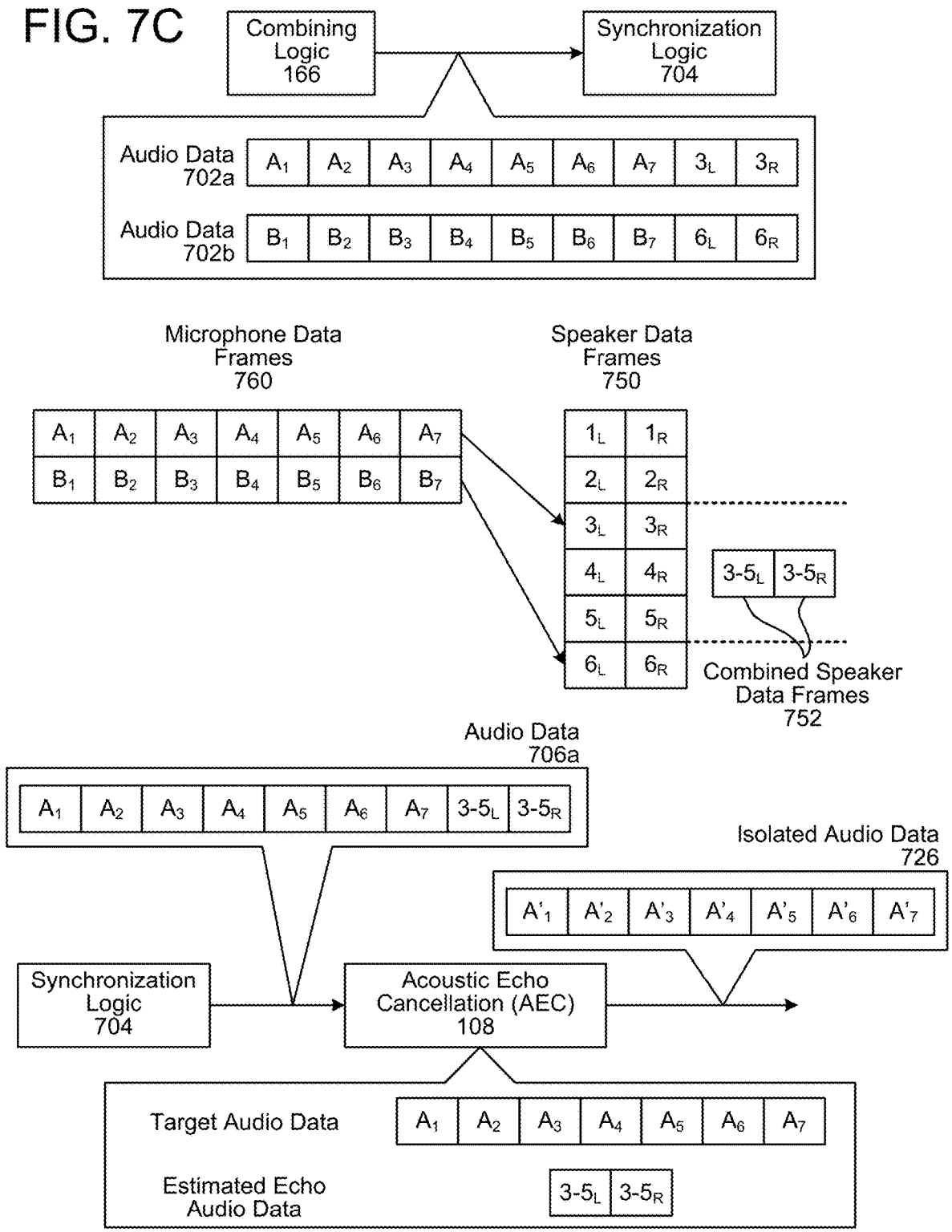

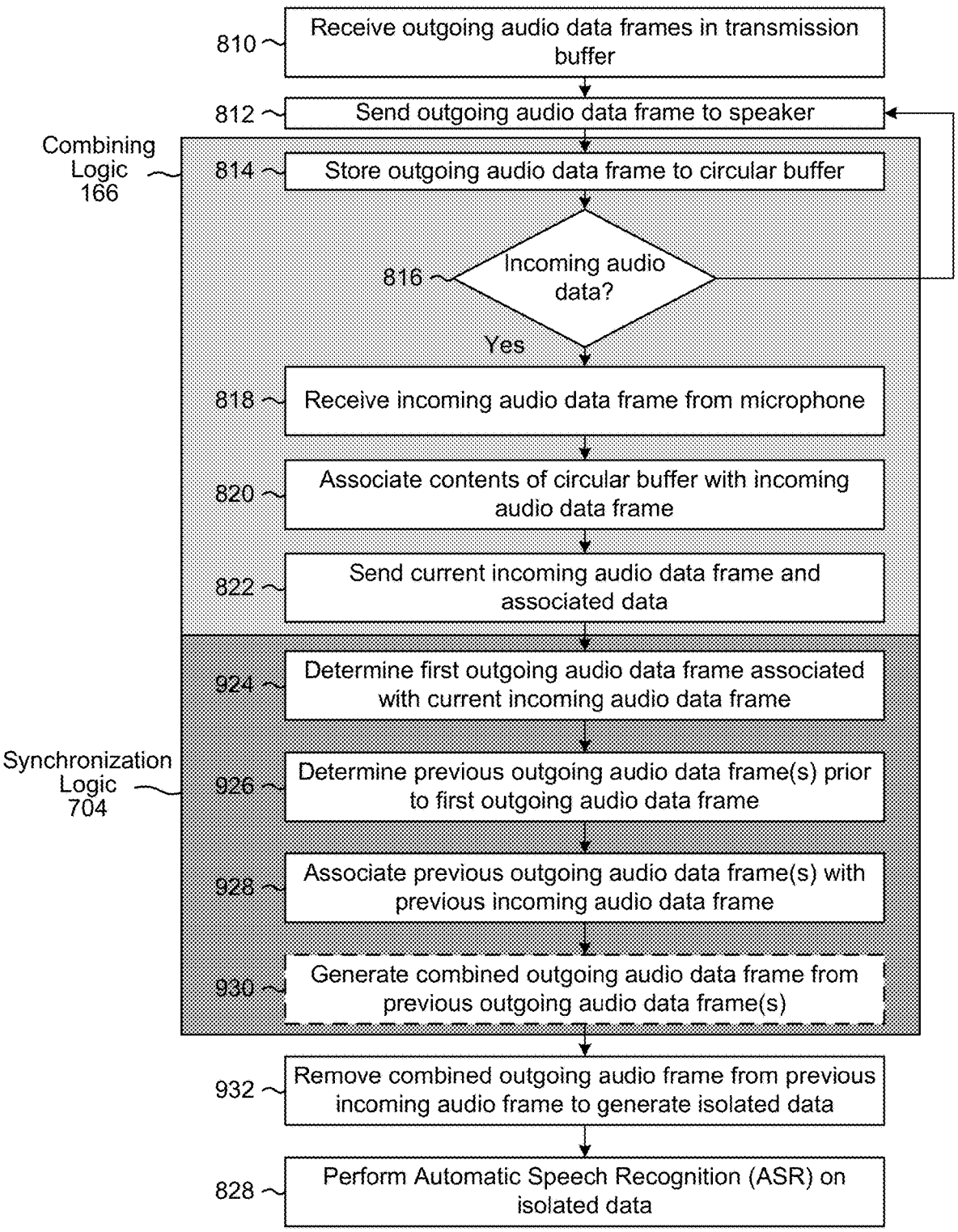

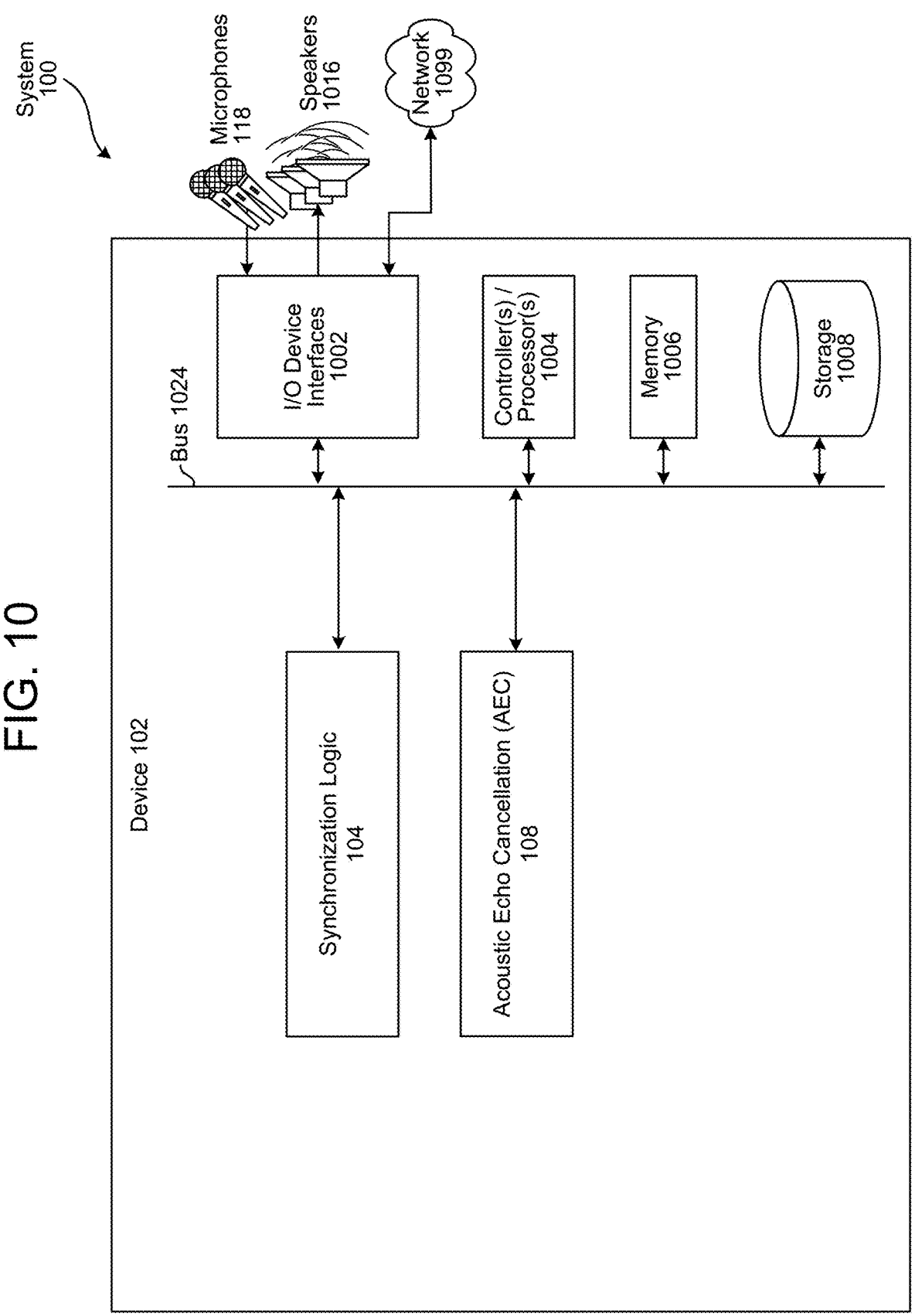

SYNCHRONIZATION OF INBOUND AND OUTBOUND AUDIO IN A HETEROGENEOUS ECHO CANCELLATION SYSTEM

BACKGROUND

In audio systems, automatic echo cancellation (AEC) refers to techniques that are used to recognize when a system has recaptured sound via a microphone after some delay that the system previously output via a speaker. Systems that provide AEC subtract a delayed version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

FIGS. 1A-1B illustrate echo cancellation systems according to embodiments of the present disclosure.

FIG. 3 illustrates an example of associating outgoing audio data frames with incoming audio data frames according to embodiments of the present disclosure.

FIGS. 7A-7C illustrate an example of associating a single outgoing audio data frame with a single incoming audio data frame and performing echo cancellation according to embodiments of the present disclosure.

FIG. 9 is a flowchart conceptually illustrating an example method for synchronizing buffers according to embodiments of the present disclosure.

FIG. 10 is a block diagram conceptually illustrating example components of a system for echo cancellation according to embodiments of the present disclosure.

DETAILED DESCRIPTION

Figure 1B:
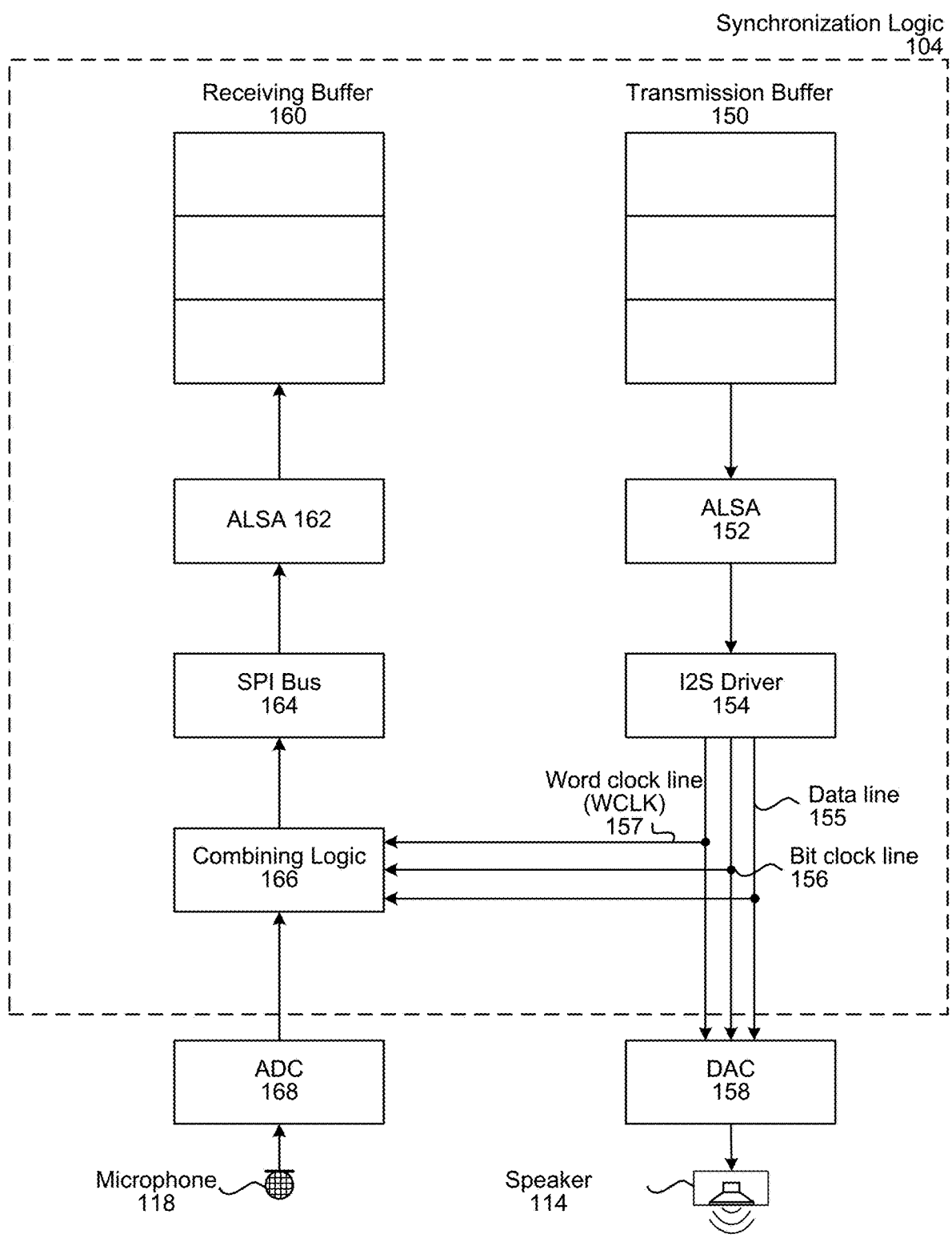

Typically, a conventional Acoustic Echo Cancellation (AEC) system may remove audio output by a loudspeaker from audio captured by the system's microphone(s) by subtracting a delayed version of the originally transmitted audio. In a heterogeneous audio system where outgoing audio packets (e.g., outbound audio data sent to a loudspeaker) are controlled by different hardware (e.g., separate integrated circuits and/or devices) than incoming audio packets (e.g., incoming audio data received by a microphone), problems with the typical AEC approach may occur when the incoming audio packets are not synchronized with the outgoing audio packets. For example, when the AEC system attempts to remove the audio output by the loudspeaker from audio captured by the system's microphone(s) by subtracting a delayed version of the originally transmitted audio, the audio captured by the microphone may be subtly different than the audio that had been sent to the loudspeaker.

Differences between the audio captured by the microphone and the audio output by the loudspeaker may be a result of variable delays inherent in the system. A first cause of variable delay is that the outgoing audio packets sent to the loudspeaker may be modified based on compression/decompression during communication, which isn't performed at a fixed rate or associated with a fixed delay. A second cause is non-linear post-processing performed on the outgoing audio packets by the loudspeaker prior to generating audio. A third cause is buffering performed by the loudspeaker, which could create unknown latency, additional samples, fewer samples or the like. As a result, even if the outgoing audio packets are synchronized with the incoming audio packets in software on the device, the variable delays cannot be accounted for and affect the AEC processing.

However, converting digital audio signals into analog audio signals ("D/A conversion") and converting analog audio signals into digital audio signals ("A/D conversion") are associated with fixed delays that are predictable. Such conversions are commonplace in audio systems, such as when the loudspeaker performs D/A conversion on the outgoing audio packets to recreate an analog signal and when the microphone performs A/D conversion from the audio captured by the microphone to generate the incoming audio packets. Therefore, synchronizing outgoing audio packets as they are received by a digital-to-analog converter with incoming audio packets as they are generated by an analog-to-digital converter accounts for variable delays present in the system.

To improve a synchronization of outgoing audio data with incoming audio data, devices, systems and methods may synchronize the outgoing audio data (as the outgoing audio data is sent to a digital-to-analog converter (DAC) in a loudspeaker) with incoming audio data (as the incoming audio data is sent from an analog-to-digital converter (ADC) in a microphone). For example, the system may append a most recent outgoing audio data frame to an incoming audio data frame in order to synchronize incoming audio data frames to the outgoing audio data frames. As the incoming audio data frames (when sent by the ADC) are associated with the outgoing audio data frames (when sent to the DAC), the incoming audio data frames and the outgoing audio data frames may be synchronized using fixed delays, avoiding variable delays caused by layers of software. Therefore, incoming audio data frames may be time aligned with the outgoing audio data frames.

FIG. 1A illustrates a high-level conceptual block diagram of echo-cancellation aspects of an AEC system 100 using conventional AEC. As illustrated, an audio input 110 provides stereo audio "reference" signals $x_1(n)$ 112a and $x_2(n)$ 112b. The reference signal $x_1(n)$ 112a is transmitted to a loudspeaker 114a, and the reference signal $x_2(n)$ 112b is transmitted to a loudspeaker 114b. Each speaker 114 outputs the received audio data, and portions of the output sounds are captured by a pair of microphones 118a and 118b as "echo" signals $y_1(n)$ 120a and $y_2(n)$ 120b, which contain some of the reproduced sounds from the reference signals $x_1(n)$ 112a and $x_2(n)$ 112b, in addition to any additional sounds (e.g., speech) picked up by the microphones 118.

To isolate the additional sounds from the reproduced sounds, the device 102 may include synchronization logic 104 that may synchronize the echo signals 120 and the reference signals 112 to generate audio data 106, which may include incoming audio data and outgoing audio data that is time-aligned. In some examples, the incoming audio data and the outgoing audio data are separate, such that the audio data 106 includes one or more channels of incoming audio data and one or more channels of outgoing audio data. However, the disclosure is not limited thereto and in some examples the incoming audio data and the outgoing audio data are combined, such that the audio data 106 includes one or more channels of incoming and outgoing audio data without departing from the disclosure. For example, audio data frames associated with the outgoing audio data may be appended to audio data frames associated with the incoming audio data, as will be discussed in greater detail below.

To generate the incoming audio data and the outgoing audio data, the synchronization logic 104 may receive the reference signals 112 (e.g., audio data transmitted to the loudspeakers 114) and the echo signals 120 (e.g., audio data generated by the microphones 118) and may generate the outgoing audio data by delaying and/or processing the reference signals 112 based on the echo signals 120. For example, the outgoing audio data may compensate for a propagation delay between the reference signals 112 and the echo signals 120 such that a beginning of the outgoing audio data corresponds to a beginning of the incoming audio data.

Additionally or alternatively, the synchronization logic 104 may compensate for distortion, variable delay, drift, skew and/or frequency offset between the reference signals 112 and the echo signals 120. In some examples, the synchronization logic 104 may determine a frequency offset between the modified reference signals 112 and the echo signals 120 and may add/drop samples of the modified reference signals and/or the echo signals 120 to compensate for the frequency offset. For example, the synchronization logic 104 may add at least one sample per cycle when the frequency offset is positive and may remove at least one sample per cycle when the frequency offset is negative. Therefore, the incoming audio data may be aligned with the outgoing audio data.

The Acoustic Echo Cancellation (AEC) 108 may remove the outgoing audio data (e.g., reproduced sounds) from the incoming audio data (e.g., reproduced sounds and additional sounds) to remove the reproduced sounds and isolate the additional sounds (e.g., speech) as isolated audio data 126. To illustrate, the device 102 may use the incoming audio data as a target signal, which may be shown in equation (1):

$$\text{Target} = s + z + \text{noise} \quad (1)$$

where s is speech (e.g., the additional sounds), z is an echo from the reference signals 112 sent to the loudspeaker (e.g., the reproduced sounds) and noise is additional noise that is not associated with the speech or the echo. In order to attenuate the echo (z), the device 102 may use the outgoing audio data as a reference signal, which may be shown in equation 2:

$$\text{Reference} = z + \text{noise} \quad (2)$$

By removing the reference signal (e.g., outgoing audio data) from the target signal (e.g., incoming audio data), the device 102 may remove the echo and generate the isolated audio data 126 including only the speech and some noise. The device 102 may use the isolated audio data 126 to perform speech recognition processing on the speech to determine a command and may execute the command. For example, the device 102 may determine that the speech corresponds to a command to play music and the device 102 may play music in response to receiving the speech.

The device 102 may use a variety of techniques to perform AEC. As a first example, the device 102 may remove a normal reference signal from input audio received by the microphone 118. As a second example, the device 102 may remove a normal reference signal from a portion of the input audio, such as by beamforming the input audio and selecting a first portion of the input audio corresponding to a first direction. As a third example, the device 102 may remove an adaptive reference signal from the input audio, such as by beamforming the input audio and selecting a first portion of the input audio corresponding to a first direction as the adaptive reference signal. As a fourth example, the device 102 may remove an adaptive reference signal from a portion of the input audio. However, the present disclosure is not limited thereto and the device 102 may perform AEC using any techniques known to one of skill in the art.

As illustrated in FIG. 1A, the device 102 may send (130) output audio data to speaker(s) and may receive (132) input audio data from microphone(s). The device 102 may align (134) the input audio data to the output audio data, may remove (136) an echo from the input audio data by removing the output audio data from the input audio data and may output (138) isolated audio data 126 including the speech or additional sounds. The device 102 may determine (140) a command using the isolated audio data and may execute (142) the command. For example, the device 102 may remove music (e.g., reproduced sounds) played over the loudspeakers 114 to isolate a voice command input to the microphones 118 and may execute the voice command, such as by changing a song, opening an application, controlling a volume or the like.

An audio signal includes audio data. For ease of illustration, the disclosure may refer to audio signal(s) and audio data interchangeably. For example, the reference signals x 112 may be referred to as reference audio data x 112 without departing from the disclosure. In addition, audio data may include a series of audio data frames (e.g., packets of audio data). Thus, the reference audio data x 112 may include a series of audio data frames (e.g., outgoing audio data frames). The reference signals x 112 may be output to speaker(s) 114 for playback and may be used as reference signals for echo cancellation. Therefore, the reference signal(s) x 112 may be referred to as reference audio data, playback audio data, output audio data, outgoing audio data, outgoing audio data frames, or the like without departing from the disclosure. Similarly, the echo signals y 120 may be referred to as echo audio data y 120 without departing from the disclosure. As the echo signals y 120 are received as input to microphone(s) 118, they may be referred to as echo audio data, input audio data, incoming audio data, incoming audio data frames, or the like without departing from the disclosure. The echo signals y 120 may be used as target signals for echo cancellation.

The number of reference signal(s) x 112 corresponds to a number of audio channels associated with the speaker(s)

114. For example, FIG. 1A illustrates two speakers 114, so the reference signals x 112 correspond to two audio channels (e.g., stereo audio). However, the disclosure is not limited thereto and the number of output audio channels may vary without departing from the disclosure. For example, surround sound may correspond to five channels, 5.1 surround sound may correspond to six channels, 6.1 surround sound may correspond to seven channels, 7.1 surround sound may correspond to eight channels, and so on. Similarly, the number of echo signal(s) y 120 corresponds to a number of audio channels associated with the microphone(s) 118. For example, FIG. 1A illustrates two microphone(s) 118, so the echo signals y 120 correspond to two audio channels. However, the disclosure is not limited thereto and the number of input audio channels may vary without departing from the disclosure. For example, a microphone array may include seven microphones 118, corresponding to seven input audio channels.

In some examples, separate audio channels may be wired separately. For example, the first reference signal x 112a may be separate from the second reference signal x 112b, such that the output audio data is sent to the speakers 114 as two separate data streams (e.g., series of outgoing audio data frames). However, the disclosure is not limited thereto and two or more audio channels may be combined into a single wired connection. For example, the output audio data may be sent to the speakers 114 as a single data stream, with a first series of outgoing audio data frames corresponding to the first reference signal x 112a and a second series of outgoing audio data frames corresponding to the second reference signal x 112b. As used herein, separate audio channels may be combined, such that a single data stream includes audio data corresponding to the separate audio channels. For example, the second series of outgoing audio data frames may be appended to the first series of outgoing audio data frames without departing from the disclosure.

FIG. 1B illustrates an example of synchronization logic 104 synchronizing incoming audio data 122 with outgoing audio data 124. The device 102 is an example of a heterogeneous audio system where outgoing audio packets (e.g., outbound audio data sent to a loudspeaker) are controlled by different hardware (e.g., separate integrated circuits and/or devices) than incoming audio packets (e.g., inbound audio data received by a microphone). For example, the outgoing audio stream extending from a transmission buffer 150 to the speaker 114 may be controlled by a first integrated circuit having a first clock and the incoming audio stream extending from the microphone 118 to a receiving buffer 160 may be controlled by a second integrated circuit having a second clock. As another example, a digital-to-analog converter (DAC) 158 may be a first integrated circuit having a first clock, an analog-to-digital converter (ADC) 168 may be a second integrated circuit having a second clock, and combining logic 166 may be a third integrated circuit having a third clock. Therefore, the synchronization logic 104 may use the combining logic 166 in order to compensate for differences between the unsynchronized clocks.

As illustrated in FIG. 1B, the synchronization logic 104 may store output audio data in a transmission buffer 150 and may include first Advanced Linux Sound Architecture (ALSA) 152 and an Integrated Interchip Sound (I2S) Driver 154 that sends output audio data to a digital-to-analog converter (DAC) 158 associated with a speaker 114 for audio playback. The DAC 158 converts the output audio data from a digital signal to an analog signal and the loudspeaker 114 produces audible sound by driving a "voice coil" with an amplified version of the analog signal. As used herein, an audio data frame (e.g., sample) is a portion of audio data and contains amplitude (e.g., loudness) information at a particular point in time. For example, the output audio data may include a series of outgoing audio data frames (e.g., outgoing or outbound audio data) and the speaker may produce sound by playing the series of outgoing audio data frames in sequence to produce frequencies. Similarly, the microphone 118 may generate the input audio data based on frequencies received by the microphone 118 and the input audio data may include a series of incoming audio data frames (e.g., incoming or inbound audio data).

A microphone 118 may receive speech and the audible sound and an analog-to-digital converter (ADC) 168 may convert the received signal from an analog signal to a digital signal and may send the digital signal to the combining logic 166 as input audio data. The combining logic 166 may associate the input audio data with the output audio data. For example, the combining logic 166 may store the output audio data in a circular buffer as it is sent to the speaker 114 and may associate the contents of the circular buffer with the input audio data as it is received.

In some examples, the combining logic 166 may associate the contents of the circular buffer with the input audio data using reference indicators, an association table and/or other forms of data that is separate from the input audio data itself. However, the disclosure is not limited thereto and the combining logic 166 may modify the input audio data to include at least a portion of the output audio data without departing from the disclosure. For example, the combining logic 166 may append the contents of the circular buffer to the input audio data to generate combined audio data that includes both the input audio data and the output audio data. To illustrate an example, if the input audio data is associated with seven channels (e.g., seven microphones 118 in a microphone array) and the output audio data is associated with two channels (e.g., two speakers 114 in a stereo), the combined audio data may be associated with nine channels. Similarly, if the input audio data is associated with seven channels and the output audio data is associated with six channels (e.g., 5.1 surround sound, with the sixth channel being associated with the subwoofer), the combined audio data may be associated with thirteen channels.

The combining logic 166 may output the combined audio data (e.g., individual audio data frames) to a Serial Peripheral Interface (SPI) bus 164 that sends the combined audio data to a second ALSA 162 and the synchronization logic 104 may store the combined audio data in one or more buffers. For example, the synchronization logic 104 may identify a first portion of the combined audio data associated with the input audio data and may store the first portion in a receiving buffer 160.

In some examples, the synchronization logic 104 may use a second portion of the combined audio data to synchronize the transmission buffer 150 and the receiving buffer 160. Thus, the synchronization logic 104 may associate the output audio data stored in the transmission buffer 150 with corresponding input audio data stored in the transmission buffer 160. As a result, the audio data 106 generated by the synchronization logic 104 may include the input audio data stored in the receiving buffer 160 and the output audio data stored in the transmission buffer 150. However, the disclosure is not limited thereto, and the synchronization logic 104 may store the second portion of the combined audio data in a second buffer without departing from the disclosure. Therefore, the audio data 106 output by the synchronization logic 104 may include output audio data corresponding to the output audio data stored in the transmission buffer 150 and/or the output audio data included in the second portion of the combined audio data without departing from the disclosure.

While the examples above illustrate the combining logic 166 outputting the combined audio data, the disclosure is not limited thereto. In some examples, the combining logic 166 may output the input audio data along with additional data that associates the output audio data with the input audio data. For example, the combining logic 166 may generate metadata or other information that indicates specific output audio data frame(s) associated with a single input audio data frame. Thus, the combining logic 166 may send the single input audio data frame to the receiving buffer 160 and the synchronization logic 104 may associate the single input audio data frame with the output audio data frame(s) stored in the transmission buffer 150 based on the metadata. To illustrate an example, the metadata or other information may be stored in a header associated with the input audio data. Additionally or alternatively, the combining logic 166 may output the input audio data and the output audio data as separate audio data without departing from the disclosure. For example, the combining logic 166 may send the input audio data to the receiving buffer 160 and separately send the output audio data (e.g., contents of the circular buffer in the combining logic 166) to a second buffer (not illustrated).

To illustrate an example, the synchronization logic 104 may receive the reference signals 112 and may store the reference signals 112 in the transmission buffer 150 as the output audio data. Thus, the output audio data sent to the speaker 114 may correspond to the reference signals 112. Similarly, the synchronization logic 104 may receive the echo signals 120 from the microphone 118 and may store the echo signals 120 in the receiving buffer 160 as the input audio data. Thus, the input audio data received from the microphone 118 may correspond to the echo signals 120. The synchronization logic 104 may identify outgoing audio data frames (e.g., audio data frames included in the output audio data) that are associated with an incoming audio data frame (e.g., audio data frame included in the input audio data) and synchronize contents of the transmission buffer 150 and contents of the receiving buffer 160 accordingly. Thus, the audio data 106 may include the input audio data along with output audio data that is synchronized (e.g., time-aligned) with the input audio data. For example, the synchronization logic 104 may generate the output audio data by time-shifting (e.g., delaying) the reference signals 112 to compensate for the propagation delay.

The synchronization logic 104 may monitor the output audio data sent from the I2S driver 154 to the DAC 158. For example, the I2S driver 154 may send the output audio data to the DAC 158 using at least one data line 155, a bit clock line 156 and a word clock line (WCLK) 157. The bit clock line 156 may pulse once for each discrete bit of data on the data lines, and a bit clock frequency is a product of the sample rate, the number of bits per channel and the number of channels. For example, output audio data with a sample frequency of 44.1 kHz, with 16 bits of precision and two channels (e.g., stereo) has a bit clock frequency of 1.4112 MHz. The word clock line (WCLK) 157 indicates whether a first audio channel (e.g., Left channel) or a second audio channel (e.g., Right channel) is being transmitted, as I2S allows two channels to be sent on a single data line. Therefore, by monitoring the WLCK 157, the synchronization logic 104 may determine when each audio data frame is sent. For example, the synchronization logic 104 may identify discrete audio data frames based on when the WCLK 157 toggles (e.g., switches from low to high or from high to low).

While the above examples illustrate the WCLK 157 indicating whether the first audio channel or the second audio channel is being transmitted, implying that the output audio data sent by the I2S driver 154 corresponds to two channels, the disclosure is not limited thereto. Instead, the output audio data may correspond to a single channel or to three or more channels (e.g., 5 channels for surround sound audio, 6 channels for 5.1 surround sound, 7 channels for 6.1 surround sound, 8 channels for 7.1 surround sound, etc.) without departing from the disclosure. Thus, the combining logic 166 may monitor the WLCK 157 to determine the number of channels included in the output audio data.

To synchronize the input audio data with the output audio data, the combining logic 166 may append outgoing audio data frames sent to the DAC 158 to incoming audio data frames received from the ADC 168. For example, the combining logic 166 may store each outgoing audio data frame of the output audio data (e.g., audio data sent using the at least one data line 155) in a buffer. When an incoming audio data frame is received from the ADC 168, the combining logic 166 may append the incoming audio data frame with the outgoing audio data frame(s) stored in the buffer to generate a combined audio data frame.

The combining logic 166 may send the combined audio data frame using the SPI bus 164. Another component included in the synchronization logic 104 may separate the combined audio data frame into a first portion corresponding to the incoming audio data frame and a second portion corresponding to the outgoing audio data frame(s). For example, the combining logic 166 may be a low-level component (e.g., close to the DAC 158 and the ADC 168 on a hardware level) that does not suffer from variable latency, whereas the other component may be a high-level component (e.g., application running on the device 102) that synchronizes the receiving buffer 160 and the transmission buffer 150. As discussed above, the synchronization logic 104 may store the first portion in the receiving buffer 160 and may use the second portion to synchronize the contents of the receiving buffer 160 with the contents of the transmission buffer 150. However, the disclosure is not limited thereto and the synchronization logic 104 may store the second portion in a second buffer without departing from the disclosure.

As an illustration, the transmission buffer 150 may store a first outgoing audio data frame as a first entry and may send the first outgoing audio data frame to the DAC 158. After determining that the WLCK 157 toggled (e.g., transitioned from a low signal to a high signal), the combining logic 166 may store the first outgoing audio data frame in a buffer (e.g., circular buffer). The ADC 168 may receive a first incoming audio data frame from the microphone 118 and the combining logic 166 may store the contents of the buffer (e.g., first outgoing audio data frame) in the first incoming audio data frame (e.g., append the first outgoing audio data frame to the first incoming audio data frame) or otherwise associate the contents of the buffer with the first incoming audio data frame. The first incoming audio data frame may be sent to the receiving buffer 160 and, the receiving buffer 160 may store the first incoming audio data frame as a first entry in the receiving buffer 160. Based on the first outgoing audio data frame being appended to and/or associated with the first incoming audio data frame, the synchronization logic 104 may synchronize the first entry in the transmission buffer 150 with the first entry in the receiving buffer 160. Thus, the first entry of the receiving buffer 160 corresponds to the first entry of the transmission buffer 150 as contents of the first entry of the receiving buffer 160 (e.g., first incoming audio data frame) were received by the microphone 118 substantially simultaneously to when contents of the first entry of the transmission buffer 150 (e.g., first outgoing audio data frame) were sent to the speaker 114 to be output as audible sound.

As a first example, a first sample rate of the speaker 114 may be identical to a second sample rate of the microphone 118, such that each subsequent entry in the transmission buffer 150 corresponds to each subsequent entry in the receiving buffer 160. For example, the transmission buffer 150 may store a second outgoing audio data frame as a second entry and may send the second outgoing audio data frame to the DAC 158. After determining that the WLCK 157 toggled (e.g., transitioned from a low signal to a high signal), the combining logic 166 may store the second outgoing audio data frame in the buffer. The ADC 168 may receive a second incoming audio data frame from the microphone 118 and the combining logic 166 may append the contents of the buffer (e.g., second outgoing audio data frame) to the second incoming audio data frame or associate the contents of the buffer with the second incoming audio data frame. The second incoming audio data frame may be sent to the receiving buffer 160, the receiving buffer 160 may store the second incoming audio data frame as a second entry in the receiving buffer 160 and, based on the second outgoing audio data frame associated with or appended to the second incoming audio data frame, the second entry of the receiving buffer 160 may be associated with the second entry of the transmission buffer 150.

Figure 2A:
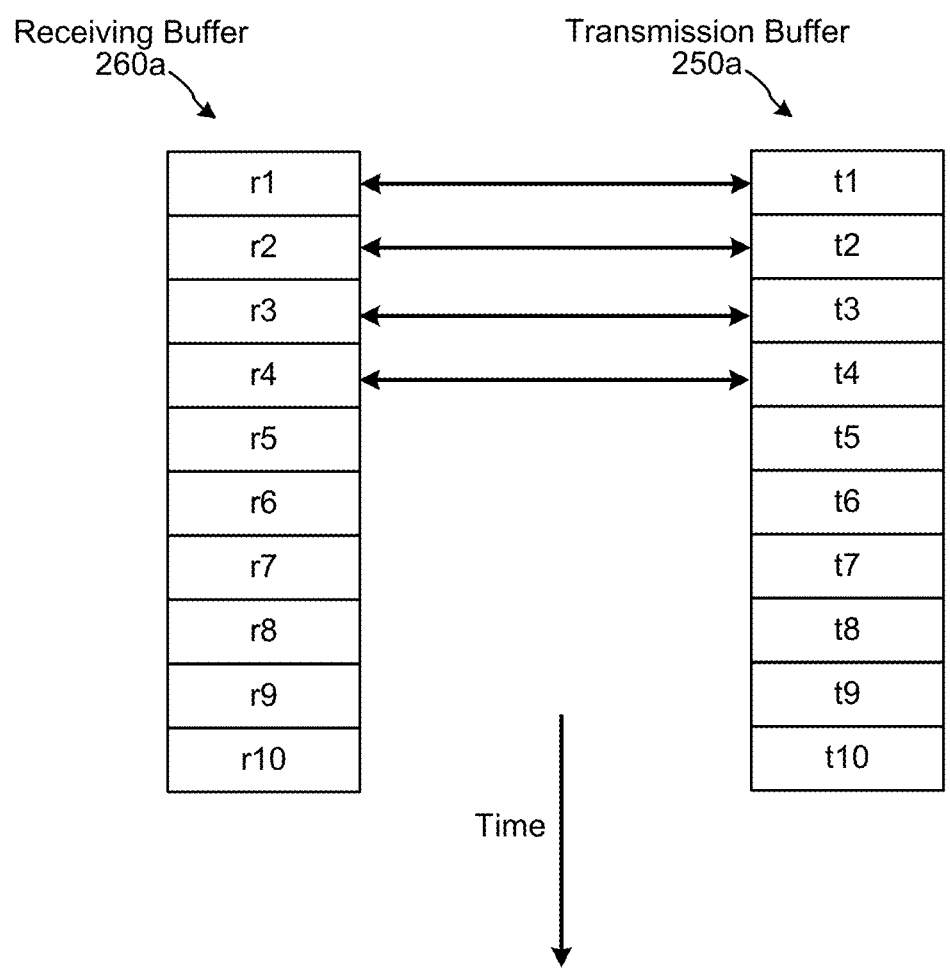
FIGS. 2A-2B illustrate examples of synchronized buffers according to embodiments of the present disclosure.

FIG. 2A illustrates the first example. As illustrated in FIG. 2A, a second entry r2 of the receiving buffer 260*a* corresponds to a second entry t2 of the transmission buffer 260*a* as contents of the second entry r2 of the receiving buffer 260*a* (e.g., second incoming audio data frame) were received by the microphone 118 substantially simultaneously to when contents of the second entry t2 of the transmission buffer 250*a* (e.g., second outgoing audio data frame) were sent to the speaker 114 to be output as audible sound.

As a second example, a first sample rate (e.g., 48 kHz) of the speaker 114 may be different than a second sample rate (e.g., 16 kHz) of the microphone 118, such that there are multiple entries in the transmission buffer 150 for a single entry in the receiving buffer 160. For example, the transmission buffer 150 may store a second outgoing audio data frame as a second entry t2, a third outgoing audio data frame as a third entry t3 and a fourth outgoing audio data frame as a fourth entry t4, and may send the second outgoing audio data frame, the third outgoing audio data frame and the fourth outgoing audio data frame to the DAC 158. After determining that the WLCK 157 toggled for the second outgoing audio data frame, the combining logic 166 may store the second outgoing audio data frame in the buffer in place of the first outgoing audio data frame. After determining that the WLCK 157 toggled for the third outgoing audio data frame, the combining logic 166 may store the third outgoing audio data frame in the buffer in place of the second outgoing audio data frame. After determining that the WLCK 157 toggled for the fourth outgoing audio data frame, the combining logic 166 may store the fourth outgoing audio data frame in the buffer in place of the third outgoing audio data frame.

At this point, the ADC 168 may receive a second incoming audio data frame from the microphone 118 and the combining logic 166 may append the contents of the buffer (e.g., fourth outgoing audio data frame) to the second incoming audio data frame. The second incoming audio data frame may be sent to the receiving buffer 160, the receiving buffer 160 may store the second incoming audio data frame as a second entry r2 in the receiving buffer 160 and, based on the fourth outgoing audio data frame being associated with the second incoming audio data frame, the synchronization logic 104 may associate the second entry r2 in the receiving buffer 160 with the fourth entry t4 in the transmission buffer 150.

Figure 2B:
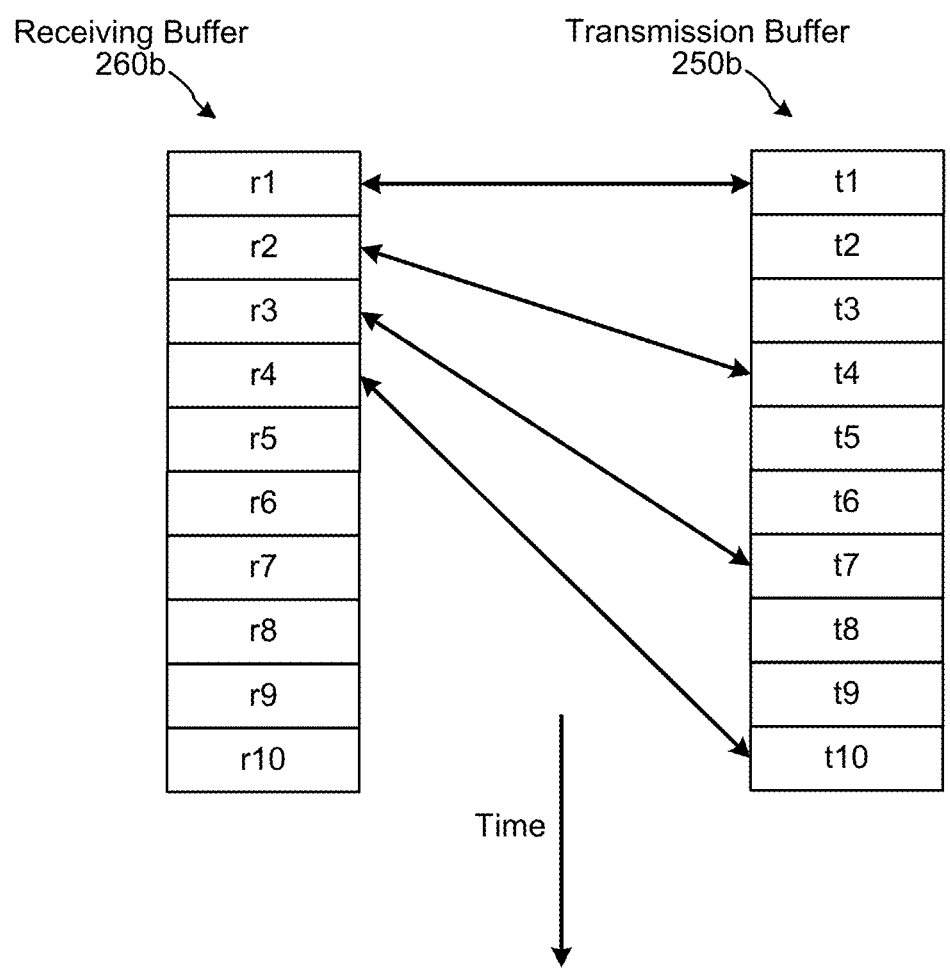

FIG. 2B illustrates the second example. As illustrated in FIG. 2B, a second entry r2 of the receiving buffer 260*b* corresponds to the fourth entry t4 of the transmission buffer 250*b* as contents of the second entry r2 of the receiving buffer 260*b* (e.g., second incoming audio data frame) were received by the microphone 118 substantially simultaneously to when contents of the fourth entry t4 of the transmission buffer 250*b* (e.g., fourth outgoing audio data frame) were sent to the speaker 114 to be output as audible sound. Therefore, due to the 3:1 ratio of the first sample rate to the second sample rate, a series of incoming audio data frames may be associated with a sequence of frame counter values (e.g., 1, 4, 7, etc.) and corresponding entries in the transmission buffer 250*b*.

In some examples, the synchronization logic 104 may store the combined audio data frame (e.g., second incoming audio data frame and the fourth outgoing audio data frame) in the receiving buffer 260*b*. However, the disclosure is not limited thereto and the synchronization logic 104 may remove the fourth outgoing audio data frame from the second incoming audio data frame prior to storing the second incoming audio data frame in the receiving buffer 260*b* without departing from the disclosure. In this case, while the incoming audio data frames stored in the receiving buffer 260*b* no longer include the outgoing audio data frames or other information associating the outgoing audio data frames stored in the transmission buffer 250*b* with the incoming audio data frames, the device 102 may associate the incoming audio data frames stored in the receiving buffer 260*b* with the outgoing audio data frames stored in the transmission buffer 250*b* based on the sequence that the incoming audio data frames/outgoing audio data frames are stored. For example, the device 102 may determine a sampling ratio comparing a first sampling rate of the speaker 114 to a second sampling rate of the microphone 118 and therefore associate the outgoing audio data frames with the incoming audio data frames based on the sampling ratio. To illustrate, due to the 3:1 sampling ratio illustrated in FIG. 2B, the device 102 may associate the first entry r1 in the receiving buffer 260*b* with entries t1-t3 of the transmission buffer 250*b*, the second entry r2 in the receiving buffer 260*b* with entries t4-t6 of the transmission buffer 250*b*, and so on. In some examples, the device 102 may associate the first entry r1 in the receiving buffer 260*b* with the first entry t1 in the transmission buffer 250*b* and discard the second entry t2 and the third entry t3 in the transmission buffer 250*b*. However, the disclosure is not limited thereto and the device 102 may instead calculate a mean or other mathematical function of the entries t1-t3 in the transmission buffer 250*b*.

To perform AEC, the synchronization logic 104 may use the entries stored in the receiving buffer 160 to generate the incoming audio data and the entries stored in the transmission buffer 150 to generate the outgoing audio data. For example, the synchronization logic 104 may compensate for a propagation delay between the speaker 114 and the microphone 118 so that first audio data associated with a first time in the incoming audio data corresponds to second audio data associated with the first time in the outgoing audio data. Thus, the synchronization logic 104 may determine the propagation delay and may compensate for the propagation delay.

After generating and synchronizing the incoming audio data and the outgoing audio data, the device 102 may perform AEC to generate the isolated audio data 126. For example, the AEC 108 may receive the incoming audio data and the outgoing audio data and may remove the outgoing audio data from the incoming audio data to generate the isolated audio data including the speech or additional sounds.

Using techniques discussed above with regard to FIGS. 1A-2B, the device 102 may synchronize incoming audio data with outgoing audio data based on when the incoming audio data is actually received by the microphone 118 and the outgoing audio data is actually output by the speaker 114. As there is a fixed, deterministic delay (e.g., 5 ms) caused by the DAC 158 and the ADC 168, the device 102 may synchronize the incoming audio data with the outgoing audio data with a nonvariable time difference (e.g., 5 ms) that is below a threshold. In contrast, if the device 102 synchronized the echo signals 120 with the reference signals 112 using higher level software (e.g., further away from the DAC 158/ADC 168, such as in the transmission buffer 150 and the receiving buffer 160), there would be a variable, non-deterministic delay (e.g., 5 ms to 10 ms) through multiple software layers as the audio packets are sent to the speaker 114 and/or received by the microphone 118. Thus, the echo signals 120 would be synchronized to the reference signals 112 with a time difference that is above the threshold and/or a variable time difference (e.g., 5 ms to 10 ms), resulting in distortion in the isolated audio data 126.

As discussed above, the I2S driver 154 may send the output audio data using at least one data line 155, a bit clock line 156 and a word clock line (WCLK) 157. The bit clock line 156 may pulse once for each discrete bit of data on the data lines, and a bit clock frequency is a product of the sample rate, the number of bits per channel and the number of channels. For example, output audio data with a sample frequency of 44.1 kHz, with 16 bits of precision and two channels (e.g., stereo) has a bit clock frequency of 1.4112 MHz. The WCLK 157 may toggle when an audio channel changes and/or may indicate a current audio channel, such as whether a first audio channel (e.g., Left channel) or a second audio channel (e.g., Right channel) is being transmitted, as I2S allows two channels to be sent on a single data line. While the above examples illustrate the WCLK 157 indicating whether the first audio channel or the second audio channel is being transmitted, implying that the output audio data sent by the I2S driver 154 corresponds to two channels, the disclosure is not limited thereto. Instead, the output audio data may correspond to a single channel or to three or more channels (e.g., 5 channels for surround sound audio, 6 channels for 5.1 surround sound, 7 channels for 6.1 surround sound, 8 channels for 7.1 surround sound, etc.) without departing from the disclosure. Thus, the combining logic 166 may monitor the WLCK 157 to determine the number of channels included in the output audio data.

FIG. 3 illustrates an example of associating outgoing audio data frames with incoming audio data frames according to embodiments of the present disclosure. As illustrated in FIG. 3, input audio data may be sent using a microphone frame clock 310 that indicates a beginning of an individual audio frame for microphone data frames 320. For example, a high signal 312a corresponds to a beginning of a first incoming audio data frame A and a high signal 312b corresponds to a beginning of second incoming audio data frame B. Similarly, output audio data may be sent using a speaker frame clock 330 that indicates a beginning of an audio frame for speaker data frames 340. For example, a high signal 332a corresponds to a beginning of first outgoing audio data frame 1, a high signal 332d corresponds to a beginning of fourth outgoing audio data frame 4, and so on.

The combining logic 166 may monitor the outgoing audio data frames sent from the I2S driver 154 to the DAC 158. For example, the combining logic 166 may monitor the speaker frame clock 330 to determine when each outgoing audio data frame is sent to the DAC 158 and may store the outgoing audio data frame to a buffer. In some examples, the buffer may be a circular buffer storing a single outgoing audio data frame at a time, which is updated as the outgoing audio data frames are sent to the DAC 158. Thus, the contents of the circular buffer correspond to a most recent outgoing audio data frame. However, the disclosure is not limited thereto and the circular buffer may store a number of outgoing audio data frames based on a difference in frequency between the microphone frame clock 310 and the speaker frame clock 330. For example, FIG. 3 illustrates the speaker frame clock 330 having a frequency that is three times faster than the microphone frame clock 310. Thus, the first incoming audio data frame A corresponds to outgoing audio data frames 1-3, the second incoming audio data frame B corresponds to outgoing audio data frames 4-6, and so on. As a result, the circular buffer may store three outgoing audio data frames at a time.

The combining logic 166 may determine that an incoming audio data frame is being received based on the microphone frame clock 310. In some examples, the combining logic 166 may detect that the microphone frame clock 310 has a high signal 312 and may identify a most recent outgoing audio data frame, which may be stored in the buffer. The combining logic 166 may associate the most recent outgoing audio data frame with the incoming audio data frame. For example, the combining logic 166 may append the outgoing audio data frame (e.g., the first outgoing audio data frame 1) to the incoming audio data frame (e.g., the first incoming audio data frame A). Based on the most recent outgoing audio data frame being appended to the most recent incoming audio data frame, the synchronization logic 104 may synchronize the outgoing audio data frames (e.g., speaker data frames 350) with the incoming audio data frames (e.g., microphone data frames 360).

In some examples, the difference in frequency between the microphone frame clock 310 and the speaker frame clock 330 results in multiple outgoing audio data frames being associated with a single incoming audio data frame. For example, outgoing audio data frames 1-3 are associated with incoming audio data frame A, while outgoing audio data frames 4-6 are associated with incoming audio data frame B. In some examples, after synchronizing, the synchronization logic 104 may determine a combined audio data frame based on the multiple outgoing audio data frames. For example, the synchronization logic 104 may determine that outgoing audio data frames 1-3 are associated with the first incoming audio data frame A and may generate a combined outgoing audio data frame that corresponds to outgoing audio data frames 1-3. The synchronization logic 104 may determine the combined outgoing audio data frame using techniques known to one of skill in the art, such as simple averaging, decimation or the like. The AEC 108 may use the combined outgoing audio data frame to remove an estimated echo from the first incoming audio data frame A to generate isolated audio data 126.

Figure 4:
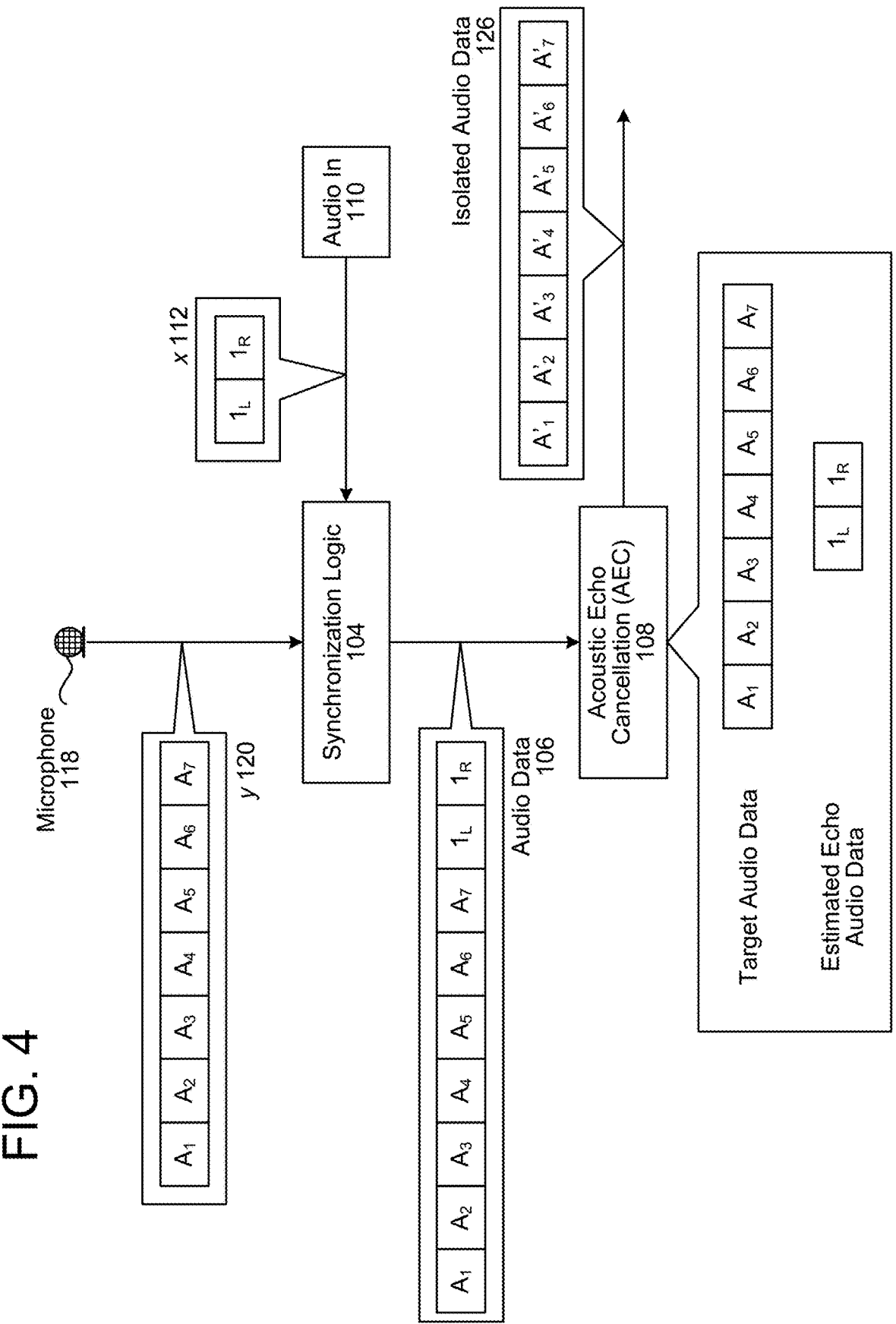
FIG. 4 illustrates an example of associating outgoing audio data frames with incoming audio data frames and performing echo cancellation according to embodiments of the present disclosure.

FIG. 4 illustrates an example of associating outgoing audio data frames with incoming audio data frames and performing echo cancellation according to embodiments of the present disclosure. As illustrated in FIG. 4, the synchronization logic 104 may receive echo signals y 120 (e.g., incoming audio data frames $A_1$-$A_7$) from the microphone 118, which corresponds to 7 different microphones in a microphone array. The synchronization logic 104 may also receive reference signals x 112 (e.g., outgoing audio data frames $1_L$ and $1_R$) from the audio in component 110, which corresponds to stereo audio. In the example illustrated in FIG. 4, the input audio data (e.g., echo signals y 120) have the same frequency as the output audio data (e.g., reference signals x 112) and therefore a single outgoing audio data frame corresponds to each of the incoming audio data frames. Thus, the synchronization logic 104 may append the echo signals y 120 with the reference signals x 112 to generate audio data 106 (e.g., incoming audio data frames $A_1$-$A_7$ and outgoing audio data frames $1_L$ and $1_R$).

While FIG. 4 illustrates the audio data 106 including the incoming audio data frames $A_1$-$A_7$ is and the outgoing audio data frames $1_L$ and $1_R$ as a single series of audio data frames (e.g., nine audio channels), the disclosure is not limited thereto. Instead, the audio data 106 may separate the incoming audio data frames $A_1$-$A_7$ and the outgoing audio data frames $1_L$ and $1_R$ and may send them to the AEC 108 as separate series of audio data frames. Thus, while the combining logic 166 may append the outgoing audio data frames $1_L$ and $1_R$ to the incoming audio data frames $A_1$-$A_7$, additional logic may separate them and send them separately to the AEC 108.

The synchronization logic 104 may send the audio data 106 to the AEC 108. The AEC 108 may determine that the incoming audio data frames $A_1$-$A_7$ is target audio data (e.g., target signals), may determine that the outgoing audio data frames $1_L$ and $1_R$ is echo audio data (e.g., reference signals), and may perform echo cancellation to generate isolated audio data 126 (e.g., audio data frames $A'_1$-$A'_7$). For example, the AEC 108 may remove at least portions of the echo audio data from the target audio data to generate the isolated audio data 126.

Figure 5:
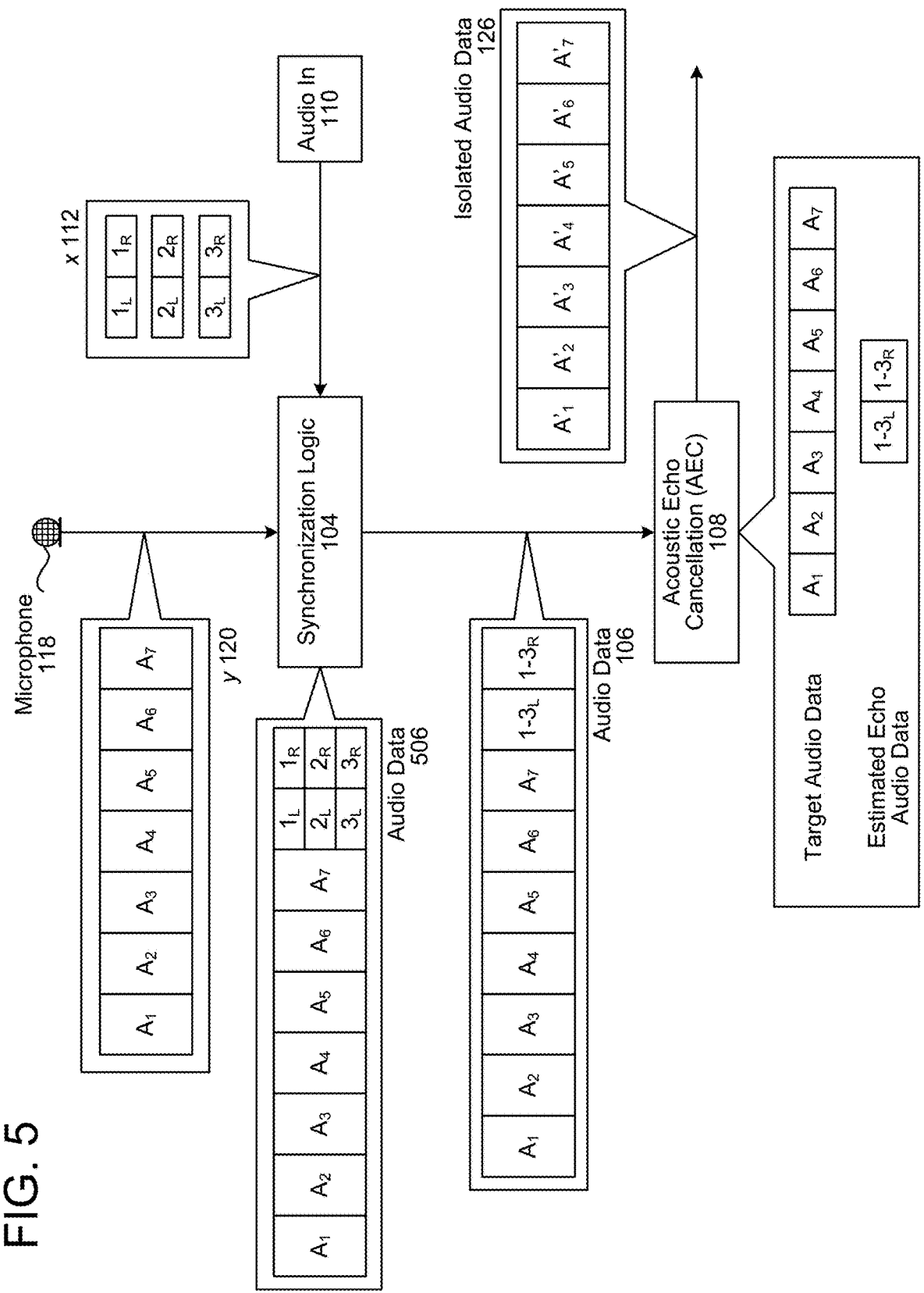
FIG. 5 illustrates an example of associating outgoing audio data frames with incoming audio data frames and performing echo cancellation according to embodiments of the present disclosure.

FIG. 5 illustrates an example of associating outgoing audio data frames with incoming audio data frames and performing echo cancellation according to embodiments of the present disclosure. As illustrated in FIG. 5, the synchronization logic 104 may receive echo signals y 120 (e.g., incoming audio data frames $A_1$-$A_7$) from the microphone 118, which corresponds to 7 different microphones in a microphone array. The synchronization logic 104 may also receive reference signals x 112 (e.g., outgoing audio data frames $1_L/1_R$) from the audio in component 110, which corresponds to stereo audio. For example, the synchronization logic 104 may receive first outgoing audio data frames $1_L/1_R$ at a first time, second outgoing audio data frames $2_L/2_R$ at a second time, and third outgoing audio data frames $3_L/3_R$ at a third time. Thus, in the example illustrated in FIG. 5, the input audio data (e.g., echo signals y 120) has a lower frequency than the output audio data (e.g., reference signals x 112) and therefore three outgoing audio data frames correspond to each of the incoming audio data frames.

In some examples, the synchronization logic 104 (e.g., combining logic 166) may append the echo signals y 120 with the reference signals x 112 to generate combined audio data. For example, depending on when the incoming audio data frames $A_1$-$A_7$ are received, the combined audio data may include the incoming audio data frames $A_1$-$A_7$ and either the outgoing audio data frames $1_L$-$1_R$ (e.g., at the first time), the outgoing audio data frames $2_L$-$2_R$ (e.g., at the second time), or the outgoing audio data frames $3_L$-$3_R$ (e.g., at the third time). The synchronization logic 104 may receive the combined audio data and may determine that the outgoing audio data frames $1_L$-$3_R$ are associated with the first incoming audio data frame A. For example, FIG. 5 illustrates the synchronization logic 104 determining audio data 506 that includes the incoming audio data frames $A_1$-$A_7$ and the outgoing audio data frames $1_L$-$3_R$.

Additionally or alternatively, the combining logic 166 may store multiple outgoing audio data frames (e.g., outgoing audio data frames $1_L$-$3_R$) in a circular buffer and may append the multiple outgoing audio data frames to the first incoming audio data frame A. For example, the synchronization logic 104 may store the outgoing audio data frames $1_L$-$1_R$ in the buffer $_{at}$ the first time, the outgoing audio data frames $2_L$-$2_R$ in the buffer at the second time, and the outgoing audio data frames $3_L$-$3_R$ in the buffer at the third time. Thus, when the incoming audio data frames $A_1$-$A_7$ are received, the synchronization logic 104 may append the outgoing audio data frames $1_L$-$3_R$ to the incoming audio data frames $A_1$-$A_7$ to generate the audio data 506.

As illustrated in FIG. 5, the synchronization logic 104 may determine the outgoing audio data frames $1_L$-$3_R$ that are associated with the incoming audio data frames $A_1$-$A_7$ and may generate combined audio data frames 1-3$_L$ and 1-3$_R$. In the example illustrated in FIG. 5, the incoming audio data frames $A_1$-$A_7$ have a frequency that is one third the frequency of the outgoing audio data frames $1_L$-$3_R$, resulting in three outgoing audio data frames (e.g., $1_L$-$1_R$, $2_L$-$2_R$, $3_L$-$3_R$) corresponding to incoming audio data frames (e.g., $A_1$-$A_7$). In order to perform echo cancellation, the synchronization logic 104 may combine and/or decimate the outgoing audio data frames (e.g., $1_L$-$1_R$, $2_L$-$2_R$, $3_L$-$3_R$) to generate combined outgoing audio data frames (e.g., 1-3$_L$ and 1-3$_R$) having the same sample rate (e.g., first frequency) as the incoming audio data frames $A_1$-$A_7$. For example, the synchronization logic 104 may generate a first combined outgoing audio data frame 1-3$_L$ corresponding to the outgoing audio data frame $1_L$, the outgoing audio data frame $2_L$, and the outgoing audio data frame $3_L$. Similarly, the synchronization logic 104 may generate a second combined outgoing audio data frame 1-3$_R$ corresponding to the outgoing audio data frame $1_R$, the outgoing audio data frame $2_R$, and the outgoing audio data frame $3_R$. However, the disclosure is not limited thereto and the synchronization logic 104 may combine the outgoing audio data frames $1_L$-$3_R$ using any technique known to one of skill in the art, including using decimation, taking an average, a weighted mean, and/or the like. Additionally or alternatively, the synchronization logic 104 may send the outgoing audio data frames $1_L$-$3_R$ without combining them, enabling the AEC 108 to combine the outgoing audio data frames $1_L$-$3_R$ or perform echo cancellation using them individually.

In some examples, instead of generating the combined outgoing audio data frames (e.g., 1-3$_L$ and 1-3$_R$) based on the second sample rate (e.g., second frequency) of the incoming audio data frames $A_1$-$A_7$, the synchronization logic 104 may instead upsample the incoming audio data frames $A_1$-$A_7$ so that the incoming audio data frames $A_1$-$A_7$ have the first sample rate (e.g., first frequency) associated with the outgoing audio data frames $1_L$-$3_R$. In some examples, this may result in the system 100 performing acoustic echo cancellation three times for each incoming audio data frame, once for each of the outgoing audio data frames. For example, the synchronization logic 104 may remove the first outgoing audio data frame $1_L$ from the first incoming audio data frame $A_1$ to generate a first corrected audio data frame $A_{11}$, may remove the second outgoing audio data frame $2_L$ from the first incoming audio data frame $A_1$ to generate a second corrected audio data frame $A_{12}$, and may remove the third outgoing audio data $3_L$ frame from the first incoming audio data frame $A_1$ to generate a third corrected audio data frame $A_{13}$. The system 100 may then combine the first corrected audio data frame $A_{11}$, the second corrected audio data frame $A_{12}$, and the third corrected audio data frame $A_{13}$. Using this technique, the output of the AEC 108 (e.g., isolated audio data 126) may correspond to the first frequency (e.g., 48 kHz) associated with the loudspeaker 114, although the disclosure is not limited thereto.

In some examples, the combining logic 166 may append outgoing audio data frames $1_L$-$3_R$ to the incoming audio data frames $A_1$-$A_7$ and the synchronization logic 104 may output the combined audio data frames as a single stream of audio data frames. For example, if the incoming audio data frames $A_1$-$A_7$ correspond to seven channels (e.g., 7 microphones in a microphone array) and the outgoing audio data frames $1_L$-$3_R$ correspond to two channels (e.g., stereo audio system), the audio data 106 output by the synchronization logic 104 may correspond to nine channels. However, the disclosure is not limited thereto and in some examples, the synchronization logic 104 may include an additional component that separates the incoming audio data frames $A_1$-$A_7$ and the outgoing audio data frames $1_L$-$3_R$ and sends them to the AEC 108 as separate streams of audio data frames. As a result, the audio data 106 may include a first stream of audio data frames corresponding to the incoming audio data frames $A_1$-$A_7$ and a second stream of audio data frames corresponding to the outgoing audio data frames $1_L$-$3_R$. Thus, while the combining logic 166 may append the outgoing audio data frames $1_L$-$3_R$ to the incoming audio data frames $A_1$-$A_7$, additional logic may separate them and send them separately to the AEC 108.

The synchronization logic 104 may send the audio data 106 to the AEC 108. The AEC 108 may determine that the incoming audio data frames $A_1$-$A_7$ corresponds to target audio data (e.g., target signals), may determine that the outgoing audio data frames $1$-$3_L$ and $1$-$3_R$ corresponds to echo audio data (e.g., reference signals), and may perform echo cancellation to generate isolated audio data 126 (e.g., audio data frames $A'_1$-$A'_7$). For example, the AEC 108 may remove at least portions of the echo audio data from the target audio data to generate the isolated audio data 126.

Figure 6A:
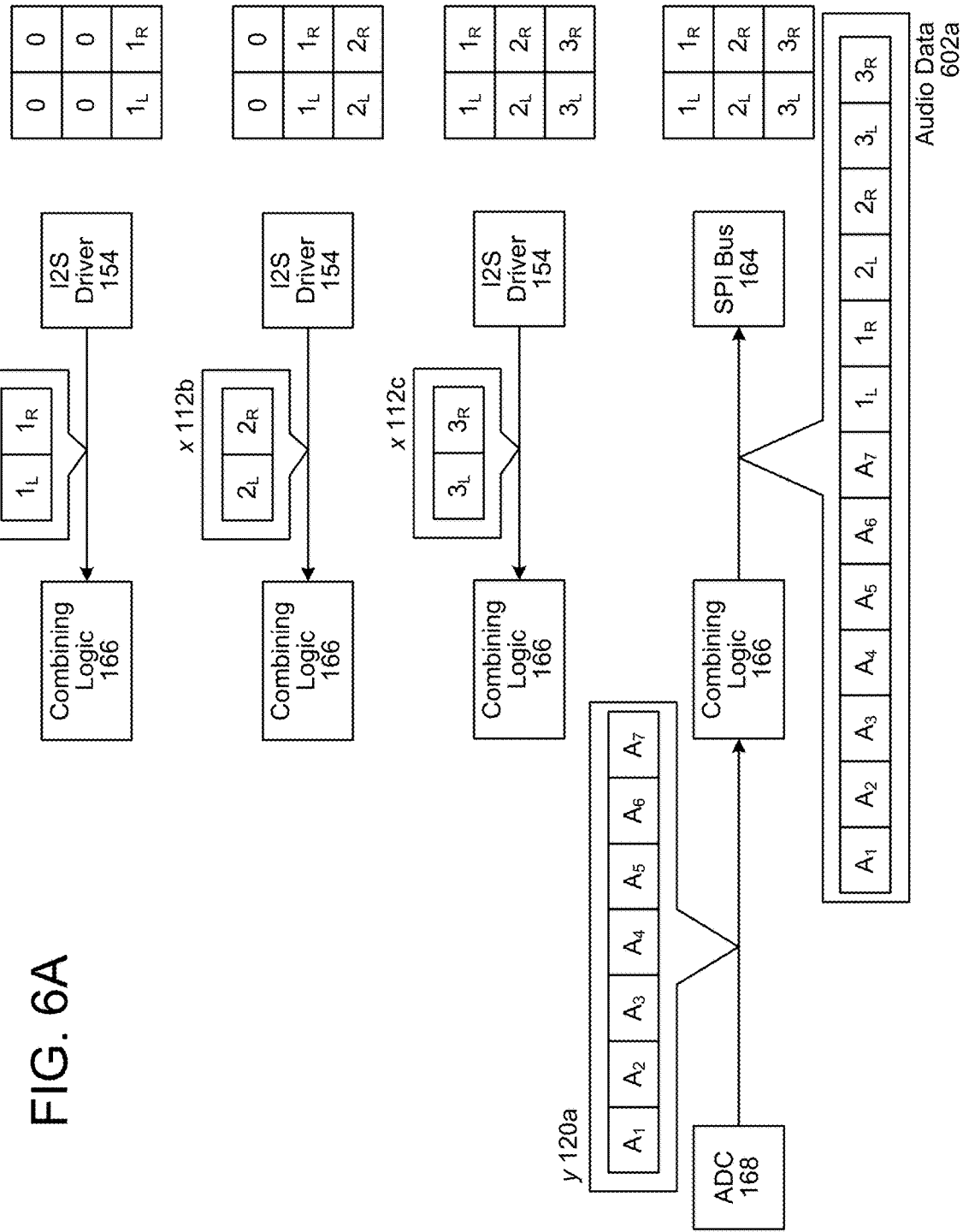
FIGS. 6A-6C illustrate an example of associating multiple outgoing audio data frames with a single incoming audio data frame and performing echo cancellation according to embodiments of the present disclosure.
Figure 6B:
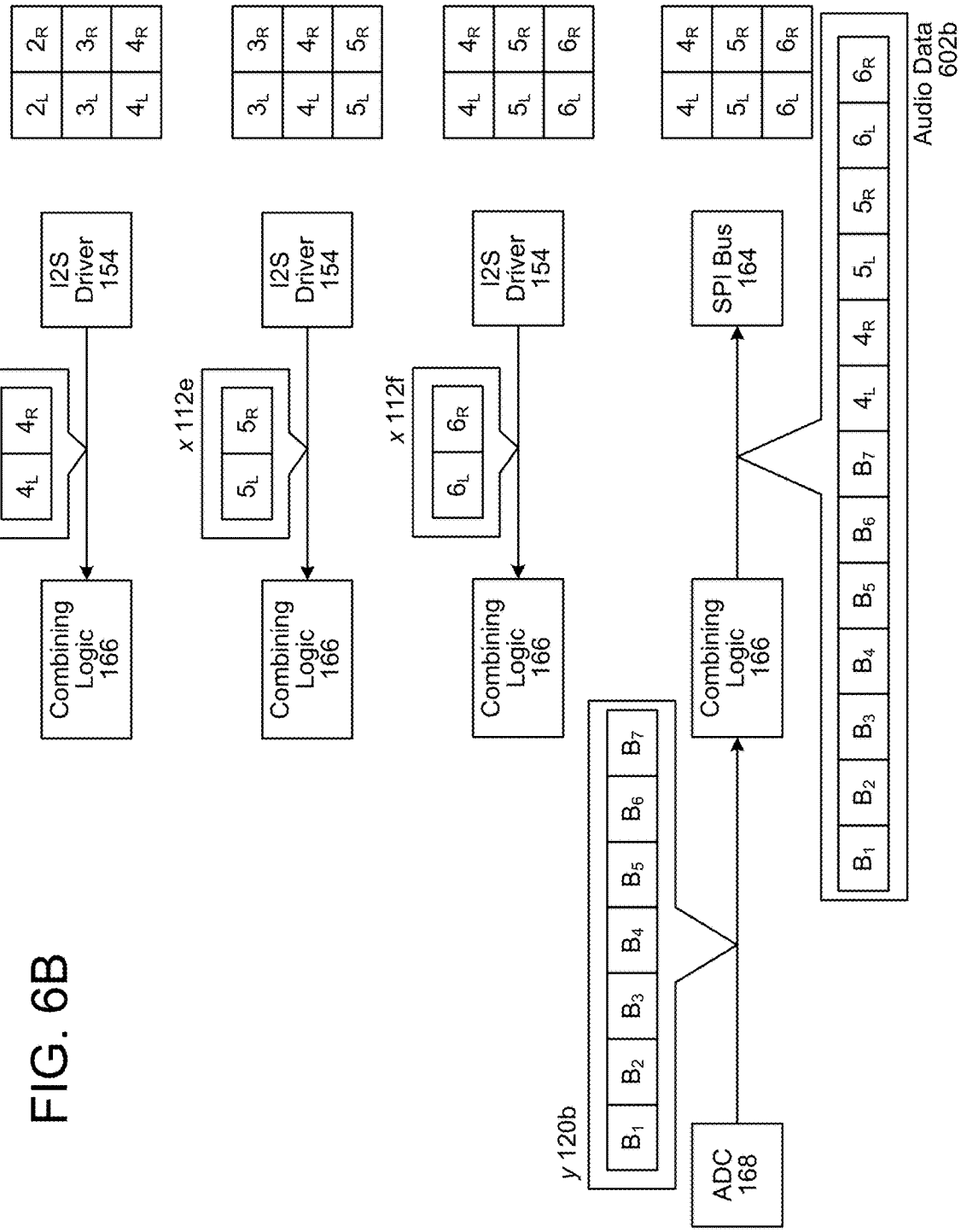
Figure 6C:
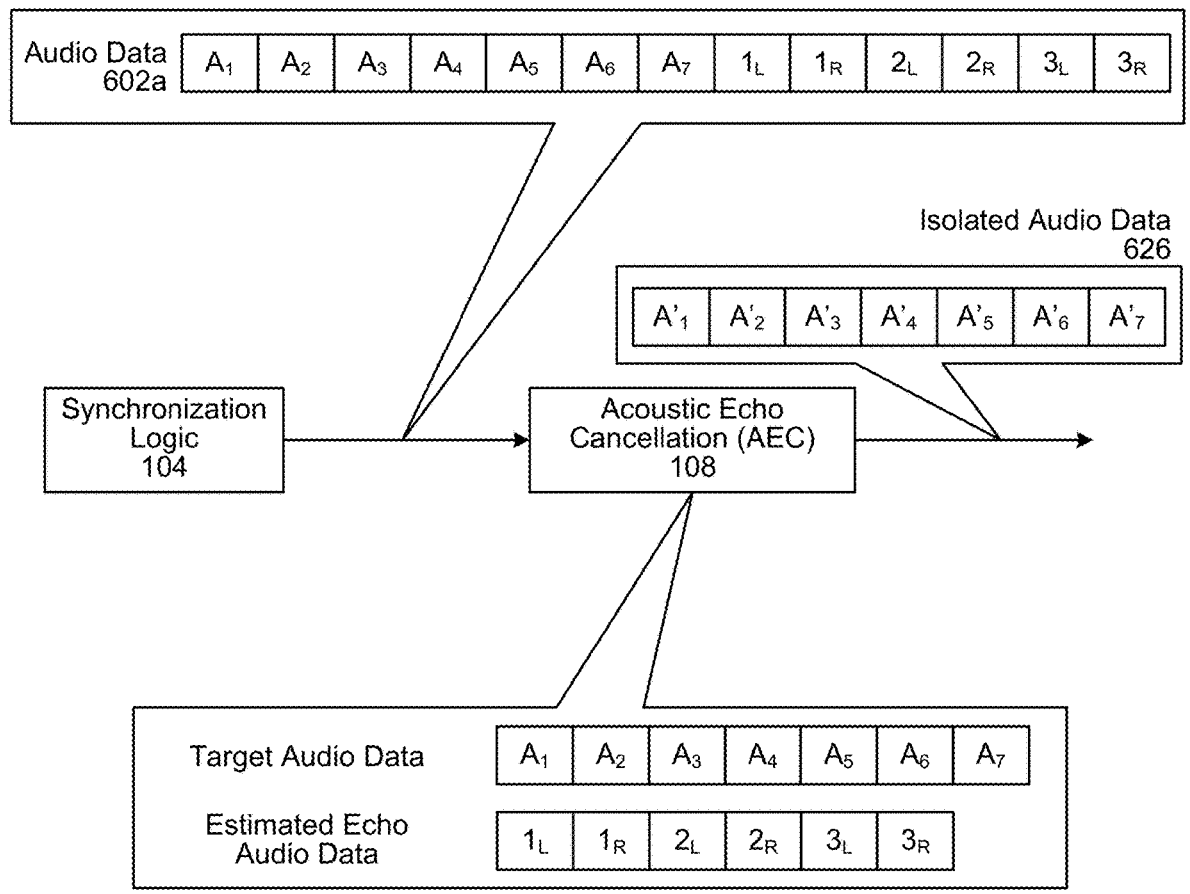

FIGS. 6A-6C illustrate an example of associating multiple outgoing audio data frames with a single incoming audio data frame and performing echo cancellation according to embodiments of the present disclosure. As illustrated in FIG. 6A, the combining logic 166 may receive first reference audio data x 112a (e.g., outgoing audio data frames $1_L$-$1_R$) at a first time and may store them as a first entry in a circular buffer, may receive second reference audio data x 112b (e.g., outgoing audio data frames $2_L$-$2_R$) at a second time and may store them as a second entry in the circular buffer, and may receive third reference audio data x 112c (e.g., outgoing audio data frames $3_L$-$3_R$) at a third time and may store them as a third entry in the circular buffer. After receiving the third reference audio data x 112c, the combining logic 166 may receive first echo audio data y 120a (e.g., incoming audio data frames $A_1$-$A_7$) from the ADC 168. Upon receiving the first echo audio data y 120a, the combining logic 166 may append the contents of the circular buffer (e.g., outgoing audio data frames $1_L$, $1_R$, $2_L$, $2_R$, $3_L$, and $3_R$) to the first echo audio data y 120a to generate first audio data 602a and may send the first audio data 602a to the SPI bus 164.

As illustrated in FIG. 6B, the combining logic 166 may receive fourth reference audio data x 112d (e.g., outgoing audio data frames $4_L$-$4_R$) at a fourth time and may store them as a fourth entry in a circular buffer (e.g., overwriting the first entry), may receive fifth reference audio data x 112e (e.g., outgoing audio data frames $5_L$-$5_R$) at a fifth time and may store them as a fifth entry in the circular buffer (e.g., overwriting the second entry), and may receive sixth reference audio data x 112f (e.g., outgoing audio data frames $6_L$-$6_R$) at a sixth time and may store them as a sixth entry in the circular buffer (e.g., overwriting the third entry). After receiving the sixth reference audio data x 112f, the combining logic 166 may receive second echo audio data y 120b (e.g., incoming audio data frames $B_1$-$B_7$) from the ADC 168. Upon receiving the second echo audio data y 120b, the combining logic 166 may append the contents of the circular buffer (e.g., outgoing audio data frames $4_L$, $4_R$, $5_L$, $5_R$, $6_L$, and $6_R$) to the second echo audio data y 120b to generate second audio data 602b and may send the second audio data 602b to the SPI bus 164.

As the first audio data 602a includes all of the reference audio data x 112 that corresponds to the first echo audio data 120a, the synchronization logic 104 may output the audio data 602a to the AEC 108 for echo cancellation, as illustrated in FIG. 6C. For example, the AEC 108 may determine that a first portion of the audio data 602a corresponds to the first echo audio data y 120 (e.g., incoming audio data frames $A_1$-$A_7$) and that a second portion of the audio data 602a corresponds to the reference audio data x 112 (e.g., outgoing audio data frames $1_L$-$3_R$). Thus, the AEC 108 may perform echo cancellation using the first portion of the audio data 602a as the target audio data (e.g., target signals) and the second portion of the audio data 602a as estimated echo audio data (e.g., reference signals) to generate isolated audio data 626 (e.g., audio data frames $A'_1$-$A'_7$).

While FIG. 6C illustrates the synchronization logic 104 outputting the audio data 602a to the AEC 108 as a single data stream, the disclosure is not limited thereto. Instead, the synchronization logic 104 may separate the first portion of the audio data 602a and the second portion of the audio data 602a and may send the first portion using a first data stream and send the second portion using a second data stream without departing from the disclosure. Additionally or alternatively, the synchronization logic 104 may use the second portion of the audio data 602a to identify outgoing audio data frames stored in the transmission buffer 150 and may send the first portion of the audio data 602a and the outgoing audio data frames from the transmission buffer 150, whether as a single data stream or as two separate data streams. In some examples, the synchronization logic 104 may combine the outgoing audio data frames and may output the first echo audio data y 120 (e.g., incoming audio data frames $A_1$-$A_7$) and combined reference audio data (e.g., first combined outgoing audio data frame $1$-$3_L$ and second combined outgoing audio data frame $1$-$3_R$) to the AEC 108 without departing from the disclosure.

FIGS. 6A-6B illustrate an example of a circular buffer used to store outgoing audio data frames prior to sending the incoming audio data frames to the receiving buffer 160. While FIGS. 6A-6B illustrate the circular buffer (e.g., a buffer with a fixed size that replaces old audio data frames with new audio data frames), the disclosure is not limited thereto and the device 102 may use any buffer known to one of skill in the art without departing from the disclosure.

Figure 7B:
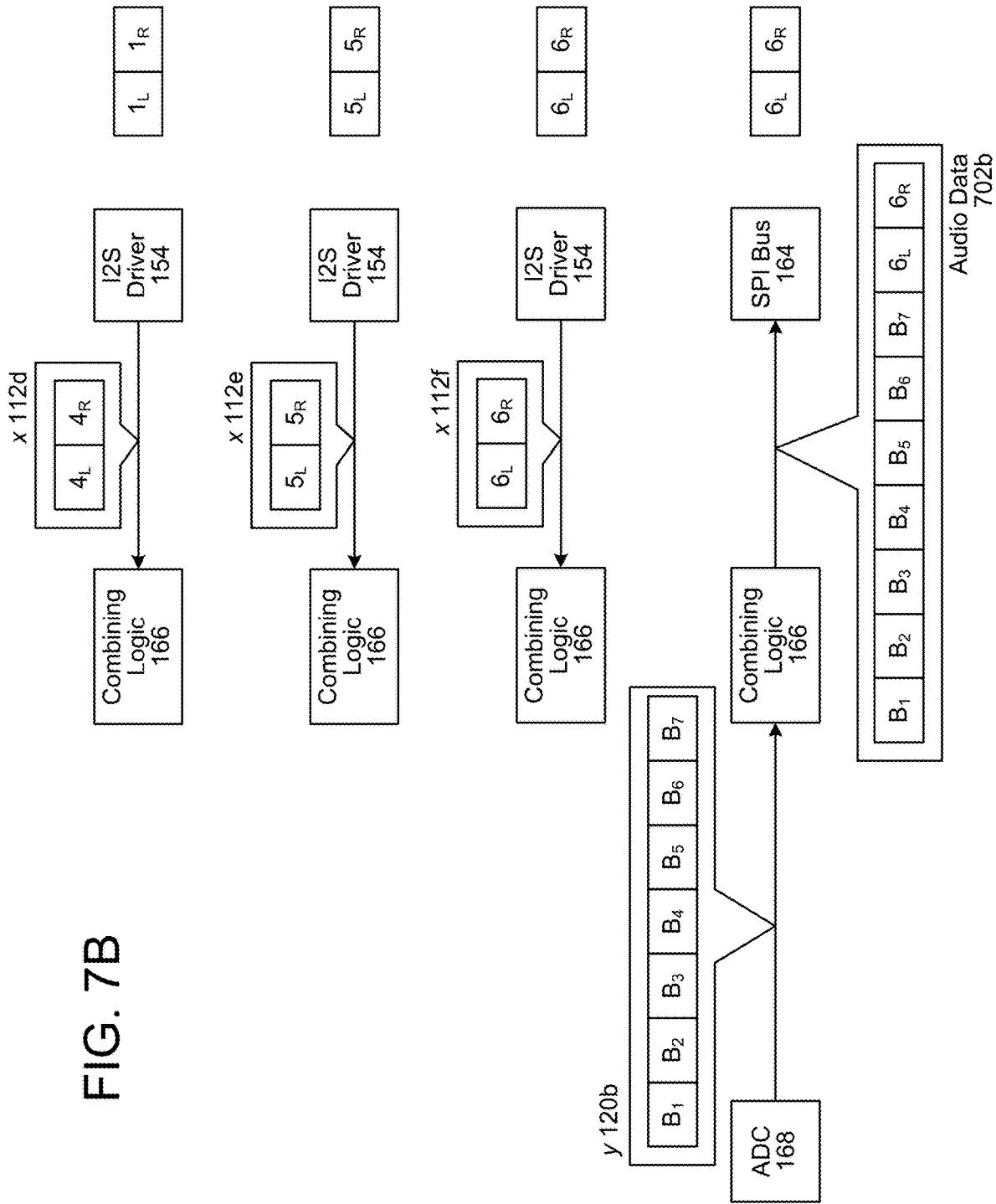

FIGS. 7A-7C illustrate an example of associating a single outgoing audio data frame with a single incoming audio data frame and performing echo cancellation according to embodiments of the present disclosure. As illustrated in FIG. 7A, the combining logic 166 may receive first reference audio data x 112a (e.g., outgoing audio data frames $1_L$-$1_R$) at a first time and may store them as a first entry in a circular buffer, may receive second reference audio data x 112b (e.g., outgoing audio data frames $2_L$-$2_R$) at a second time and may store them in the first entry in the circular buffer (e.g., overwriting the first reference audio data x 112a), and may receive third reference audio data x 112c (e.g., outgoing audio data frames $3_L$-$3_R$) at a third time and may store them in the first entry in the circular buffer (e.g., overwriting the second reference audio data x 112b). After receiving the third reference audio data x 112c, the combining logic 166 may receive first echo audio data y 120a (e.g., incoming audio data frames $A_1$-$A_7$) from the ADC 168. Upon receiving the first echo audio data y 120a, the combining logic 166 may append the contents of the circular buffer (e.g., outgoing audio data frames $3_L$ and $3_R$) to the first echo audio data y 120a to generate first audio data 702a and may send the first audio data 702a to the SPI bus 164.

As illustrated in FIG. 7B, the combining logic 166 may receive fourth reference audio data x 112d (e.g., outgoing audio data frames $4_L$-$4_R$) at a fourth time and may store them in the first entry in the circular buffer (e.g., overwriting the third reference audio data x 112c), may receive fifth reference audio data x 112e (e.g., outgoing audio data frames $5_L$-$5_R$) at a fifth time and may store them in the first entry in the circular buffer (e.g., overwriting the fourth reference audio data x 112d), and may receive sixth reference audio data x 112f (e.g., outgoing audio data frames $6_L$-$6_R$) at a sixth time and may store them in the first entry in the circular buffer (e.g., overwriting the fifth reference audio data x 112e). After receiving the sixth reference audio data x 112f, the combining logic 166 may receive second echo audio data y 120b (e.g., incoming audio data frames $B_1$-$B_7$) from the ADC 168. Upon receiving the second echo audio data y 120b, the combining logic 166 may append the contents of the circular buffer (e.g., outgoing audio data frames $6_L$ and $6_R$) to the second echo audio data y 120b to generate second audio data 702b and may send the second audio data 702b to the SPI bus 164.

As the first audio data 702a only associates a single outgoing audio data frame with the first echo audio data 120a, the synchronization logic 104 may determine a portion of the reference audio data x 112 that corresponds to the first echo audio data 120a. For example, the synchronization logic 104 may receive the first audio data 702a, separate the first audio data 702a into a first portion (e.g., incoming audio data frames $A_1$-$A_7$) and a second portion (e.g., outgoing audio data frames $3_L$-$3_R$), store the first portion as a first entry in a first buffer (e.g., microphone data frames 760), and use the second portion to identify an entry (e.g., third entry) in a second buffer (e.g., speaker data frames 750) that is associated with the first entry in the first buffer. Similarly, the synchronization logic 104 may receive the second audio data 702b, separate the second audio data 702b into a first portion (e.g., incoming audio data frames $B_1$-$B_7$) and a second portion (e.g., outgoing audio data frames $6_L$-$6_R$), store the first portion as a second entry in the first buffer (e.g., microphone data frames 760), and use the second portion to identify an entry (e.g., sixth entry) in the second buffer (e.g., speaker data frames 750) that is associated with the second entry in the first buffer.

By associating the third entry (e.g., outgoing audio data frames $3_L$-$3_R$) in the second buffer with the incoming audio data frames $A_1$-$A_7$, and associating the sixth entry (e.g., outgoing audio data frames $6_L$-$6_R$) in the second buffer with the incoming audio data frames $B_1$-$B_7$, the synchronization logic 104 may determine that intervening entries (e.g., fourth entry and fifth entry) in the second buffer are also associated with the incoming audio data frames $A_1$-$A_7$. Thus, the synchronization logic 104 may determine that outgoing audio data frames $3_L$-$5_R$ are associated with the incoming audio data frames $A_1$-$A_7$ and may generate combined speaker data frames 752 (e.g., outgoing audio data frames 3-$5_L$ and 3-$5_R$).

In some examples, the synchronization logic 104 may append the combined speaker data frames 752 to the first microphone data frames 760a (e.g., incoming audio data frames $A_1$-$A_7$) to generate the audio data 706 and may send the audio data 706a to the AEC 108 for echo cancellation. However, the disclosure is not limited thereto and the synchronization logic 104 may send the audio data 702a without departing from the disclosure. Additionally or alternatively, the synchronization logic 104 may send the first microphone data frames 760a to the AEC 108 as a separate data stream from the combined speaker data frames 752 without departing from the disclosure.

The AEC 108 may perform echo cancellation using the first microphone data frames 760a as the target audio data (e.g., target signals) and the combined speaker data frames 752 as estimated echo audio data (e.g., reference signals) to generate isolated audio data 726 (e.g., audio data frames $A'_1$-$A'_7$).

FIGS. 7A-7B illustrate an example of a circular buffer used to store outgoing audio data frames prior to sending the incoming audio data frames to the receiving buffer 160. While FIGS. 7A-7B illustrate the circular buffer (e.g., a buffer with a fixed size that replaces old audio data frames with new audio data frames), the disclosure is not limited thereto and the device 102 may use any buffer known to one of skill in the art without departing from the disclosure.

Figure 8:
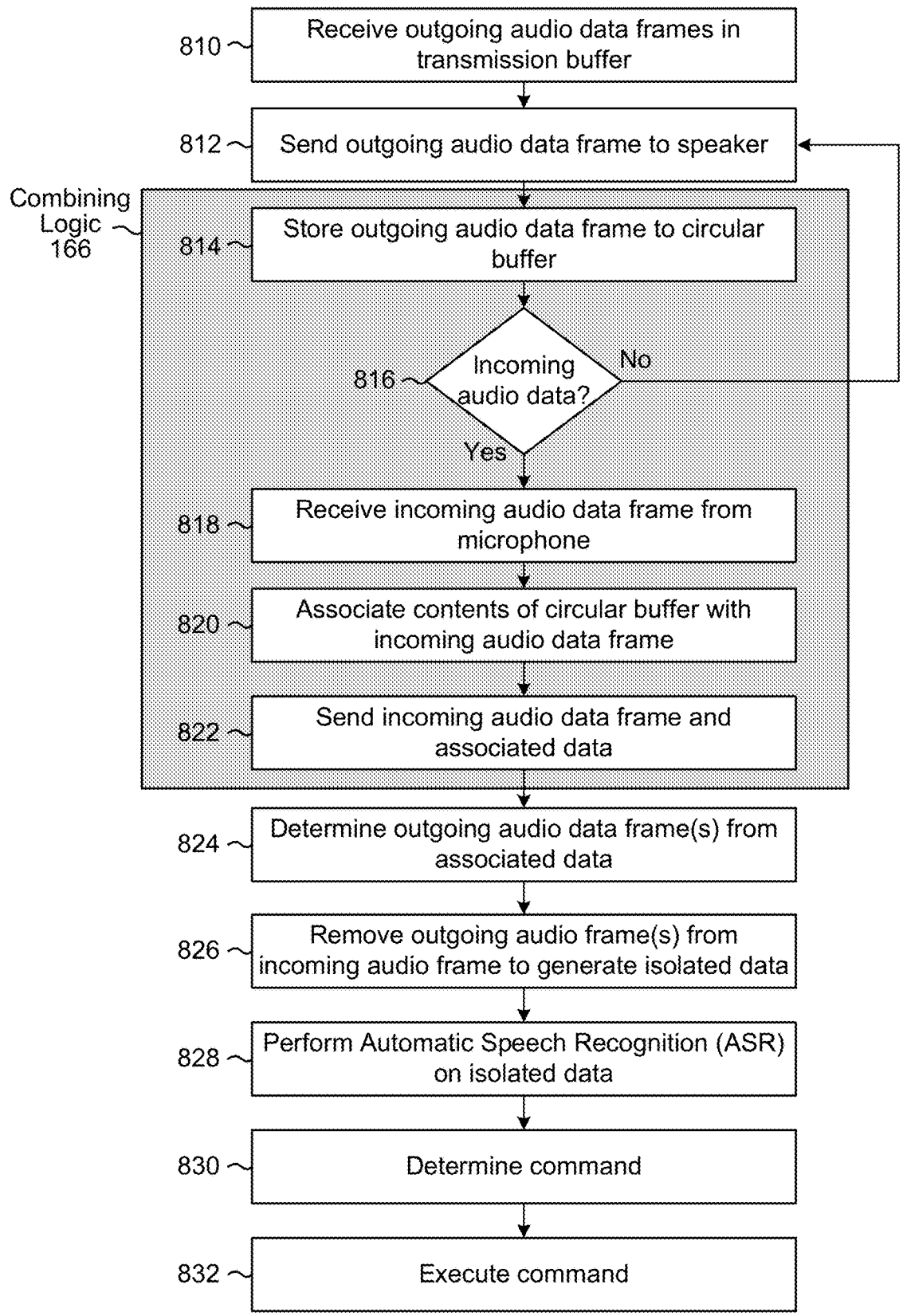
FIG. 8 is a flowchart conceptually illustrating an example method for synchronizing buffers according to embodiments of the present disclosure.

FIG. 8 is a flowchart conceptually illustrating an example method for synchronizing buffers according to embodiments of the present disclosure. As illustrated in FIG. 8, the device 102 may receive (810) outgoing audio data frames in a transmission buffer and may send (812) an outgoing audio data frame to the speaker. The device 102 may store (814) the outgoing audio data frame to a circular buffer and determine (816) whether an incoming audio data frame is received. If no incoming audio data frames are received, the device 102 may loop to step 812 and repeat steps 812-816.

If an incoming audio data frame is received, the device 102 may receive (818) the incoming audio data frame from the microphone, may associate (820) contents of the circular buffer with the incoming audio data frame and may send (822) the incoming audio data frame and any associated data. For example, the combining logic 166 may perform steps 814-822 and may send the incoming audio data frame and any associated data to the SPI bus 164.

In some examples, the combining logic 166 may append the outgoing audio data frame(s) to the incoming audio data frame and the synchronization logic 104 may send the combined audio data frame to the AEC 108. For example, the combining logic 166 may store the outgoing audio data frame(s) in the circular buffer in their entirety, such that the combined audio data frame includes both the incoming audio data frame and the outgoing audio data frame(s) without distortion. However, the disclosure is not limited thereto and in some examples, the synchronization logic 104 may include additional logic that receives the combined audio data frame from the combining logic 166 and performs additional processing. For example, the additional logic (e.g., synchronization logic 704) may separate the combined audio data frame into a first portion (e.g., incoming audio data frame) and a second portion (e.g., outgoing audio data frame(s)) and may send the first portion and the second portion to the AEC 108 as separate audio data frames.

Additionally or alternatively, the additional logic (e.g., synchronization logic 704) may separate the combined audio data frame into the first portion and the second portion and use the second portion to synchronize the transmission buffer 150 with the receiving buffer 160. For example, the additional logic may use the second portion to identify entries in the transmission buffer 150 that correspond to the incoming audio data frame (e.g., first portion) and may send the incoming audio data frame (e.g., entry in the receiving buffer 160) and the outgoing audio data frames (e.g., entry/entries in the transmission buffer 150) separately to the AEC 108. Thus, the combining logic 166 may compress or otherwise modify the outgoing audio data frame prior to storing in the circular buffer, with the contents of the circular buffer being used as a reference point to identify the outgoing audio data frames in the transmission buffer 150. For example, the contents of the transmission buffer 150 may be more detailed and/or higher quality than the contents of the circular buffer, which enables the combining logic 166 to reduce an amount of bandwidth consumed by the combined audio data frame while still associating the outgoing audio data frame(s) with a specific incoming audio data frame.

The device 102 may determine (824) outgoing audio data frame(s) from the associated data. For example, the associated data may correspond to an association table or the like and the device 102 may determine one or more outgoing audio data frames included in the transmission buffer. Additionally or alternatively, the associated data may correspond to one or more outgoing audio data frames that are appended to the incoming audio data frame and the device 102 may separate the one or more outgoing audio data frames from the incoming audio data frame and associate the one or more outgoing audio data frames with the incoming audio data frame. For example, when a sampling ratio (e.g., ratio between a first sampling rate of the speaker 114 to a second sampling rate of the microphone 118) is equal to 3:1, the device 102 may send three outgoing audio data frames for each incoming audio data frame. In some examples, only a single outgoing audio data frame may be appended to the incoming audio data frame and the device 102 may use the single outgoing audio data frame to identify multiple outgoing audio data frames stored in the transmission buffer 150 that correspond to the incoming audio data frame.

When the incoming audio data frame is sent to the receiving buffer, the receiving buffer may store the incoming audio data frame based on the contents of the circular buffer that is appended to the incoming audio data frame. In some examples, the device 102 may then discard the contents of the circular buffer (e.g., outgoing audio data frame) from the incoming audio data frame. In this example, while the incoming audio data frame stored in the receiving buffer no longer includes the outgoing audio data frame that explicitly associates the incoming audio data frame to an outgoing audio data frame in the transmission buffer, the device 102 may associate the incoming audio data frames and the outgoing audio data frames based on the sequence that the incoming audio data frames/outgoing audio data frames are stored. For example, the device 102 may determine a sampling ratio comparing a first sampling rate of the speaker 114 to a second sampling rate of the microphone 118 and therefore associate the outgoing audio data frames with the incoming audio data frames based on the sampling ratio. Additionally or alternatively, the device 102 may use the outgoing audio data frames appended to the incoming audio data frames to synchronize the receiving buffer 160 with the transmission buffer 150 and may associate intervening outgoing audio data frames with a corresponding incoming audio data frame. For example, the device 102 may associate outgoing audio data frames after the third outgoing audio data frames $3_L$-$3_R$ and before the sixth outgoing audio data frames $6_L$-$6_R$ with the first incoming audio data frame $A_1$-$A_7$.

The device 102 may remove (826) the outgoing audio data frame(s) from the incoming audio data frame to generate isolated data, may perform (828) Automatic Speech Recognition (ASR) on the isolated data to generate text, may determine (830) a command included in the text and may execute (832) the command. In some examples, the device 102 may group a first plurality of outgoing audio data frames (e.g., 384) and a second plurality of incoming audio data frames (e.g., 128) and remove the first plurality of outgoing audio data frames from the second plurality of incoming audio data frames. Thus, instead of performing echo cancellation on individual incoming audio data frames, the device 102 may perform echo cancellation on groups of incoming audio data frames. In the example illustrated above, the first number (e.g., 384) include three times the second number (e.g., 128) due to a first sampling rate (e.g., 48 kHz) of the speaker 114 being three times a second sampling rate (e.g., 16 kHz) of the microphone 118. However, the present disclosure is not limited thereto and the number of incoming audio data frames and/or outgoing audio data frames may be equal or may vary without departing from the disclosure.

FIG. 9 is a flowchart conceptually illustrating an example method for synchronizing buffers according to embodiments of the present disclosure. As illustrated in FIG. 9, the device 102 may receive (810) outgoing audio data frames in a transmission buffer and may send (812) an outgoing audio data frame to the speaker. The device 102 may store (814) the outgoing audio data frame to a circular buffer and determine (816) whether an incoming audio data frame is received. If no incoming audio data frames are received, the device 102 may loop to step 812 and repeat steps 812-816.

If an incoming audio data frame is received, the device 102 may receive (818) the incoming audio data frame from the microphone, may associate (820) contents of the circular buffer with the incoming audio data frame and may send (822) the incoming audio data frame and any associated data. For example, the combining logic 166 may perform steps 814-822 and may send the incoming audio data frame and any associated data to the SPI bus 164.

In some examples, the combining logic 166 may append the outgoing audio data frame(s) to the incoming audio data frame and the synchronization logic 104 may send the combined audio data frame to the AEC 108. For example, the combining logic 166 may store the outgoing audio data frame(s) in the circular buffer in their entirety, such that the combined audio data frame includes both the incoming audio data frame and the outgoing audio data frame(s) without distortion. However, the disclosure is not limited thereto and in some examples, the synchronization logic 104 may include additional logic that receives the combined audio data frame from the combining logic 166 and performs additional processing. For example, the additional logic (e.g., synchronization logic 704) may separate the combined audio data frame into a first portion (e.g., incoming audio data frame) and a second portion (e.g., outgoing audio data frame(s)) and may send the first portion and the second portion to the AEC 108 as separate audio data frames.

Additionally or alternatively, the additional logic (e.g., synchronization logic 704) may separate the combined audio data frame into the first portion and the second portion and use the second portion to synchronize the transmission buffer 150 with the receiving buffer 160. For example, the additional logic may use the second portion to identify entries in the transmission buffer 150 that correspond to the incoming audio data frame (e.g., first portion) and may send the incoming audio data frame (e.g., entry in the receiving buffer 160) and the outgoing audio data frames (e.g., entry/entries in the transmission buffer 150) separately to the AEC 108. Thus, the combining logic 166 may compress or otherwise modify the outgoing audio data frame prior to storing in the circular buffer, with the contents of the circular buffer being used as a reference point to identify the outgoing audio data frames in the transmission buffer 150. For example, the contents of the transmission buffer 150 may be more detailed and/or higher quality than the contents of the circular buffer, which enables the combining logic 166 to reduce an amount of bandwidth consumed by the combined audio data frame while still associating the outgoing audio data frame(s) with a specific incoming audio data frame.

The device 102 may determine (924) a first outgoing audio data frame associated with the current incoming audio data frame, determine (926) previous outgoing audio data frame(s) prior to the first outgoing audio data frame and may associate (928) the previous outgoing audio data frame(s) with a previous incoming audio data frame, as discussed above with regard to FIG. 7C.

When the incoming audio data frame is sent to the receiving buffer, the receiving buffer may store the incoming audio data frame based on the contents of the circular buffer that is appended to the incoming audio data frame. In some examples, the device 102 may then discard the contents of the circular buffer (e.g., outgoing audio data frame) from the incoming audio data frame. In this example, while the incoming audio data frame stored in the receiving buffer no longer includes the outgoing audio data frame that explicitly associates the incoming audio data frame to an outgoing audio data frame in the transmission buffer, the device 102 may associate the incoming audio data frames and the outgoing audio data frames based on the sequence that the incoming audio data frames/outgoing audio data frames are stored. For example, the device 102 may determine a sampling ratio comparing a first sampling rate of the speaker 114 to a second sampling rate of the microphone 118 and therefore associate the outgoing audio data frames with the incoming audio data frames based on the sampling ratio. Additionally or alternatively, the device 102 may use the outgoing audio data frames appended to the incoming audio data frames to synchronize the receiving buffer 160 with the transmission buffer 150 and may associate intervening outgoing audio data frames with a corresponding incoming audio data frame. For example, the device 102 may associate outgoing audio data frames after the third outgoing audio data frames $3_L$-$3_R$ and before the sixth outgoing audio data frames $6_L$-$6_R$ with the first incoming audio data frame $A_1$-$A_7$.

The device 102 may optionally generate (930) a combined outgoing audio data frame from the previous outgoing audio data frame(s). For example, if the incoming audio data frame has a first duration that corresponds to three outgoing audio data frames, the device 102 may combine the three outgoing audio data frames.

The device 102 may remove (932) the combined outgoing audio data frame from the previous incoming audio data frame to generate isolated data, may perform (828) Automatic Speech Recognition (ASR) on the isolated data to generate text, may determine (830) a command included in the text and may execute (832) the command. as discussed above with regard to FIG. 8.

FIG. 10 is a block diagram conceptually illustrating example components of the system 100. In operation, the system 100 may include computer-readable and computer-executable instructions that reside on the device 102, as will be discussed further below.

The system 100 may include one or more audio capture device(s), such as a microphone 118 or an array of microphones 118. The audio capture device(s) may be integrated into the device 102 or may be separate. The system 100 may also include an audio output device for producing sound, such as speaker(s) 114. The audio output device may be integrated into the device 102 or may be separate.

The device 102 may include an address/data bus 1024 for conveying data among components of the device 102. Each component within the device 102 may also be directly connected to other components in addition to (or instead of) being connected to other components across the bus 1024.

The device 102 may include one or more controllers/processors 1004, which may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The device 102 may also include a data storage component 1008, for storing data and controller/processor-executable instructions (e.g., instructions to perform the algorithms illustrated in FIGS. 1A, 8 and/or 9). The data storage component 1008 may include one or more non-volatile storage types such as magnetic storage, optical storage, solid-state storage, etc. The device 102 may also be connected to removable or external non-volatile memory and/or storage (such as a removable memory card, memory key drive, networked storage, etc.) through the input/output device interfaces 1002.

Computer instructions for operating the device 102 and its various components may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The device 102 includes input/output device interfaces 1002. A variety of components may be connected through the input/output device interfaces 1002, such as the speaker(s) 114, the microphones 118, and a media source such as a digital media player (not illustrated). The input/output interfaces 1002 may include A/D converters for converting the output of microphone 118 into echo signals y 120, if the microphones 118 are integrated with or hardwired directly to device 102. If the microphones 118 are independent, the A/D converters will be included with the microphones, and may be clocked independent of the clocking of the device 102. Likewise, the input/output interfaces 1002 may include D/A converters for converting the reference signals x 112 into an analog current to drive the speakers 114, if the speakers 114 are integrated with or hardwired to the device 102. However, if the speakers are independent, the D/A converters will be included with the speakers, and may be clocked independent of the clocking of the device 102 (e.g., conventional Bluetooth speakers).

The input/output device interfaces 1002 may also include an interface for an external peripheral device connection such as universal serial bus (USB), FireWire, Thunderbolt or other connection protocol. The input/output device interfaces 1002 may also include a connection to one or more networks 1099 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1099, the system 100 may be distributed across a networked environment.

The device 102 further includes synchronization logic 104 and/or an acoustic echo cancellation (AEC) 108.

Multiple devices 102 may be employed in a single system 100. In such a multi-device system, each of the devices 102 may include different components for performing different aspects of the AEC process. The multiple devices may include overlapping components. The components of device 102 as illustrated in FIG. 10 is exemplary, and may be a stand-alone device or may be included, in whole or in part, as a component of a larger device or system. For example, in certain system configurations, one device may transmit and receive the audio data, another device may perform AEC, and yet another device my use the isolated audio data 126 for operations such as speech recognition.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the Acoustic Echo Cancellation (AEC) 108 may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   outputting, via a first speaker, audible sound corresponding to first audio data;
   receiving, from a first microphone, second audio data including speech input and a first representation of the audible sound;
   determining, during a first time period, based on a first clock signal associated with the second audio data, a beginning of a first audio frame of the second audio data;
   determining, based on a second clock signal associated with the first audio data, that a first audio frame of the first audio data is being sent to the first speaker during the first time period;
   appending the first audio frame of the first audio data to the first audio frame of the second audio data;
   synchronizing, based on the first audio frame of the first audio data and the first audio frame of the second audio data, the first audio data with the second audio data;
   subtracting at least a portion of the first audio frame of the first audio data from the first audio frame of the second audio data to generate a first audio frame of isolated audio data, the isolated audio data including the speech input;
   performing speech recognition processing on the isolated audio data to determine a command; and
   executing the command.

2. The computer-implemented method of claim 1, wherein:
   the first audio data has a first sampling rate; and
   the second audio data has a second sampling rate different than the first sampling rate.

3. The computer-implemented method of claim 1, further comprising:
   sending, to the first speaker, a second audio frame of the first audio data;
   sending, to the first speaker, the first audio frame of the first audio data;
   receiving, from the first microphone, the first audio frame of the second audio data;
   appending the second audio frame of the first audio data and the first audio frame of the first audio data to the first audio frame of the second audio data; and
   determining a combined audio frame using a weighted sum of the second audio frame of the first audio data and the first audio frame of the first audio data,
   wherein subtracting at least the portion of the first audio frame of the first audio data from the first audio frame of the second audio data to generate the first audio frame of the isolated audio data further comprises:
   subtracting at least a portion of the combined audio frame from the first audio frame of the second audio data to generate the first audio frame of the isolated audio data.

4. The computer-implemented method of claim 1, further comprising:
   sending, to the first speaker after the first time period, a second audio frame of the first audio data;
   determining, during a second time period, based on the first clock signal associated with the second audio data, a beginning of a second audio frame of the second audio data;

determining, based on the second clock signal associated with the first audio data, that a third audio frame of the first audio data is being sent to the first speaker during the second time period;

appending the third audio frame of the first audio data to the second audio frame of the second audio data;

determining a plurality of audio frames of the first audio data sent to the first speaker between the first time period and the second time period, the plurality of audio frames of the first audio data including the second audio frame of the first audio data and the third audio frame of the first audio data; and determining a combined audio frame using a weighted sum of the plurality of audio frames of the first audio data, wherein subtracting at least the portion of the first audio frame of the first audio data from the first audio frame of the second audio data to generate the first audio frame of the isolated audio data further comprises:

subtracting at least a portion of the combined audio frame from the first audio frame of the second audio data to generate the first audio frame of the isolated audio data.

5. A computer-implemented method, comprising:

sending, to a first speaker, first audio data;

receiving, from a first microphone, second audio data including speech input and a first representation of audible sound output by the first speaker that corresponds to the first audio data;

determining, at a first time, based on a first clock signal associated with the second audio data, a beginning of a first audio frame of the second audio data;

determining, based on a second clock signal associated with the first audio data, a first audio frame of the first audio data that is associated with the first time;

associating the first audio frame of the first audio data with the first audio frame of the second audio data;

synchronizing, based on the first audio frame of the first audio data and the first audio frame of the second audio data, the first audio data with the second audio data;

subtracting at least a portion of the first audio frame of the first audio data from the first audio frame of the second audio data to generate a first audio frame of third audio data, the third audio data including the speech input;

performing speech recognition processing on the third audio data to determine a command; and executing the command.

6. The computer-implemented method of claim 5, wherein:

the first audio data has a first sampling rate; and the second audio data has a second sampling rate different than the first sampling rate.

7. The computer-implemented method of claim 5, further comprising:

sending, to the first speaker, a second audio frame of the first audio data;

sending, to the first speaker, the first audio frame of the first audio data;

receiving, from the first microphone, the first audio frame of the first audio data;

associating the second audio frame of the first audio data and the first audio frame of the first audio data with the first audio frame of the second audio data;

generating a combined audio frame based on the second audio frame of the first audio data and the first audio frame of the first audio data; and subtracting at least a portion of the combined audio frame from the first audio frame of the second audio data to generate a first audio frame of fourth audio data, the fourth audio data including the speech input.

8. The computer-implemented method of claim 5, further comprising:

sending, to the first speaker, a second audio frame of the first audio data;

sending, to the first speaker, the first audio frame of the first audio data;

receiving, from the first microphone, the first audio frame of the second audio data;

generating, by first logic circuitry, a combined audio frame including the first audio frame of the second audio data, the second audio frame of the first audio data and the first audio frame of the first audio data;

sending, by the first logic circuitry to second logic circuitry, the combined audio frame; and determining, by the second logic circuitry, that a first portion of the combined audio frame corresponds to the first audio frame of the second audio data, that a second portion of the combined audio frame corresponds to the second audio frame of the first audio data, and that a third portion of the combined audio frame corresponds to the first audio frame of the first audio data.

9. The computer-implemented method of claim 5, further comprising:

sending, to the first speaker, a second audio frame of the first audio data;

sending, to the first speaker, the first audio frame of the first audio data;

receiving, from the first microphone, the first audio frame of the second audio data;

generating, by first logic circuitry, a combined audio frame including the first audio frame of the second audio data and the first audio frame of the first audio data;

sending, by the first logic circuitry to second logic circuitry, the combined audio frame; and determining, by the second logic circuitry, that a first portion of the combined audio frame corresponds to the first audio frame of the second audio data and that a second portion of the combined audio frame corresponds to the first audio frame of the first audio data.

10. The computer-implemented method of claim 5, further comprising:

sending, to the first speaker after the first time, a second audio frame of the first audio data;

determining, at a second time, based on the first clock signal associated with the second audio data, a beginning of a second audio frame of the second audio data;

determining, based on the second clock signal associated with the first audio data, a third audio frame of the first audio data associated with the second time;

associating the third audio frame of the first audio data with the second audio frame of the second audio data;

determining a plurality of outgoing audio frames of the first audio data sent to the first speaker between the first time and the second time, the plurality of outgoing audio frames of the first audio data including the first audio frame of the first audio data and the second audio frame of the first audio data;

determining a combined audio frame based on the plurality of outgoing audio frames of the first audio data; and subtracting at least a portion of the combined audio frame from the first audio frame of the second audio data to generate a first audio frame of fourth audio data, the fourth audio data including the speech input.

11. The computer-implemented method of claim 5, further comprising:
sending, to the first speaker, the first audio frame of the first audio data, the first audio frame of the first audio data corresponding to two or more audio channels in a speaker system;
receiving, from the first microphone, the first audio frame of the second audio data, the first audio frame of the second audio data corresponding to two or more audio channels in a microphone array; and
generating a combined audio frame based on the first audio frame of the first audio data and the first audio frame of the second audio data, the combined audio frame corresponding to four or more audio channels.

12. The computer-implemented method of claim 5, wherein associating the first audio frame of the first audio data with the first audio frame of the second audio data further comprises:
generating a combined audio frame including at least the first audio frame of the first audio data and the first audio frame of the second audio data.

13. The computer-implemented method of claim 5, wherein synchronizing the first audio data with the second audio data further comprises:
determining a propagation delay associated with the first speaker and the first microphone; and
generating, using the first audio data and the propagation delay, fourth audio data, and
the subtracting further comprises:
determining a first audio frame of the fourth audio data that corresponds to the first audio frame of the first audio data; and
subtracting the first audio frame of the fourth audio data from the first audio frame of the second audio data to generate the first audio frame of the third audio data.

14. A first device, comprising:
at least one processor; and
memory including instructions operable to be executed by the at least one processor to cause the first device to:
send, to a first speaker, first audio data;
receive, from a first microphone, second audio data including speech input and a first representation of audible sound output by the first speaker that corresponds to the first audio data;
determine, at a first time, based on a first clock signal associated with the second audio data, a beginning of a first audio frame of the second audio data;
determine, based on a second clock signal associated with the first audio data, a first audio frame of the first audio data that is associated with the first time;
associate the first audio frame of the first audio data with the first audio frame of the second audio data;
synchronize, based on the first audio frame of the first audio data and the first audio frame of the second audio data, the first audio data with the second audio data;
subtract at least a portion of the first audio frame of the first audio data from the first audio frame of the second audio data to generate a first audio frame of third audio data, the third audio data including the speech input;
perform speech recognition processing on the third audio data to determine a command; and
execute the command.

15. The first device of claim 14, wherein:
the first audio data has a first sampling rate; and
the second audio data has a second sampling rate different than the first sampling rate.

16. The first device of claim 14, wherein the memory further comprises instructions that, when executed by the at least one processor, further cause the first device to:
send, to the first speaker, a second audio frame of the first audio data;
send, to the first speaker, the first audio frame of the first audio data;
receive, from the first microphone, the first audio frame of the first audio data;
associate the second audio frame of the first audio data and the first audio frame of the first audio data with the first audio frame of the second audio data;
generate a combined audio frame based on the second audio frame of the first audio data and the first audio frame of the first audio data; and
subtract at least a portion of the combined audio frame from the first audio frame of the second audio data to generate a first audio frame of fourth audio data, the fourth audio data including the speech input.

17. The first device of claim 14, wherein the memory further comprises instructions that, when executed by the at least one processor, further cause the first device to:
send, to the first speaker, a second audio frame of the first audio data;
send, to the first speaker, the first audio frame of the first audio data;
receive, from the first microphone, the first audio frame of the second audio data;
generate, by first logic circuitry, a combined audio frame including the first audio frame of the second audio data, the second audio frame of the first audio data and the first audio frame of the first audio data;
send, by the first logic circuitry to second logic circuitry, the combined audio frame; and
determine, by the second logic circuitry, that a first portion of the combined audio frame corresponds to the first audio frame of the second audio data, that a second portion of the combined audio frame corresponds to the second audio frame of the first audio data, and that a third portion of the combined audio frame corresponds to the first audio frame of the first audio data.

18. The first device of claim 14, wherein the memory further comprises instructions that, when executed by the at least one processor, further cause the first device to:
send, to the first speaker, a second audio frame of the first audio data;
send, to the first speaker, the first audio frame of the first audio data;
receive, from the first microphone, the first audio frame of the second audio data;
generate, by first logic circuitry, a combined audio frame including the first audio frame of the second audio data and the first audio frame of the first audio data;
send, by the first logic circuitry to second logic circuitry, the combined audio frame; and
determine, by the second logic circuitry, that a first portion of the combined audio frame corresponds to the first audio frame of the second audio data and that a second portion of the combined audio frame corresponds to the first audio frame of the first audio data.

19. The first device of claim 14, wherein the memory further comprises instructions that, when executed by the at least one processor, further cause the first device to:
send, to the first speaker after the first time, a second audio frame of the first audio data;

determine, at a second time, based on the first clock signal associated with the second audio data, a beginning of a second audio frame of the second audio data;

determine, based on the second clock signal associated with the first audio data, a third audio frame of the first audio data associated with the second time;

associate the third audio frame of the first audio data with the second audio frame of the second audio data;

determine a plurality of outgoing audio frames of the first audio data sent to the first speaker between the first time and the second time, the plurality of outgoing audio frames of the first audio data including the first audio frame of the first audio data and the second audio frame of the first audio data;

determine a combined audio frame based on the plurality of outgoing audio frames of the first audio data; and subtract at least a portion of the combined audio frame from the first audio frame of the second audio data to generate a first audio frame of fourth audio data, the fourth audio data including the speech input.

20. The first device of claim 14, wherein the memory further comprises instructions that, when executed by the at least one processor, further cause the first device to:

send, to the first speaker, the first audio frame of the first audio data, the first audio frame of the first audio data corresponding to two or more audio channels in a speaker system;

receive, from the first microphone, the first audio frame of the second audio data, the first audio frame of the second audio data corresponding to two or more audio channels in a microphone array; and generate a combined audio frame based on the first audio frame of the first audio data and the first audio frame of the second audio data, the combined audio frame corresponding to four or more audio channels.

* * * * *